US010667047B2

(12) United States Patent
Asada et al.

(10) Patent No.: US 10,667,047 B2
(45) Date of Patent: May 26, 2020

(54) HEADPHONE DEVICE, TERMINAL DEVICE, INFORMATION TRANSMITTING METHOD, AND HEADPHONE SYSTEM

(71) Applicant: Sony Corporation, Tokyo (JP)

(72) Inventors: Kohei Asada, Kanagawa (JP); Shinpei Tsuchiya, Kanagawa (JP); Yuji Kitazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 14/354,988

(22) PCT Filed: Nov. 2, 2012

(86) PCT No.: PCT/JP2012/078426
§ 371 (c)(1),
(2) Date: Apr. 29, 2014

(87) PCT Pub. No.: WO2013/069556
PCT Pub. Date: May 16, 2013

(65) Prior Publication Data
US 2014/0314245 A1 Oct. 23, 2014

(30) Foreign Application Priority Data

Nov. 9, 2011 (JP) .................................. 2011-245372

(51) Int. Cl.
*H04R 1/10* (2006.01)
*H04R 3/00* (2006.01)
(Continued)

(52) U.S. Cl.
CPC ........... *H04R 3/002* (2013.01); *G10K 11/178* (2013.01); *H04M 1/6066* (2013.01);
(Continued)

(58) Field of Classification Search
None
See application file for complete search history.

(56) References Cited

U.S. PATENT DOCUMENTS

| 5,117,461 A | * | 5/1992 | Moseley | ............ | G10K 11/1788 |
| | | | | | 381/163 |
| 2006/0182294 A1 | * | 8/2006 | Grasbon | .............. | H04R 25/558 |
| | | | | | 381/312 |

(Continued)

FOREIGN PATENT DOCUMENTS

| EP | 1681900 A1 | 7/2006 |
| EP | 1923864 A2 | 5/2008 |

(Continued)

OTHER PUBLICATIONS

English translation of WO2011/007000 A1.*

*Primary Examiner* — James K Mooney
(74) *Attorney, Agent, or Firm* — Chip Law Group

(57) ABSTRACT

This disclosure relates to a headphone device, a terminal device, an information transmitting method, a program, and a headphone system capable of reducing a process burden of parameter control in a noise canceling process of the headphone device.

In the terminal device capable of communicating with the headphone device, a parameter appropriate for the noise canceling process is determined based on analysis of noise from outside and position information and indication information to indicate a processing parameter related to the noise canceling process in the headphone device is generated. This is transmitted to the headphone device side. In the headphone device, a processing parameter of the noise canceling process is set according to the indication infor- (Continued)

mation. According to this, a process to determine an optimal parameter of the noise canceling process on the headphone device side is not required.

14 Claims, 24 Drawing Sheets

(51) Int. Cl.
    *G10K 11/178*     (2006.01)
    *H04M 1/60*     (2006.01)
    *H04R 5/04*     (2006.01)
    *H04R 5/033*     (2006.01)

(52) U.S. Cl.
    CPC ... *H04R 1/1083* (2013.01); *G10K 2210/1081* (2013.01); *G10K 2210/3031* (2013.01); *G10K 2210/3214* (2013.01); *H04R 1/1041* (2013.01); *H04R 5/033* (2013.01); *H04R 5/04* (2013.01); *H04R 2460/01* (2013.01); *H04R 2460/07* (2013.01)

(56) References Cited

U.S. PATENT DOCUMENTS

| 2009/0147969 | A1* | 6/2009 | Kinouchi | G10K 11/178 |
| | | | | 381/94.7 |
| 2010/0172510 | A1* | 7/2010 | Juvonen | G10K 11/178 |
| | | | | 381/71.6 |
| 2012/0140941 | A1* | 6/2012 | Kuhtz | B01J 15/005 |
| | | | | 381/71.6 |
| 2013/0108068 | A1* | 5/2013 | Poulsen | H04R 5/033 |
| | | | | 381/74 |

FOREIGN PATENT DOCUMENTS

| EP | 2161717 A1 | 3/2010 |
| JP | 07-210176 | 8/1995 |
| JP | 2008-116782 | 5/2008 |
| JP | 2008-122729 | 5/2008 |
| JP | 2008-250270 | 10/2008 |
| JP | 2010-028784 | 2/2010 |
| JP | 2010-028784 A | 2/2010 |
| JP | 2010-130415 | 6/2010 |
| WO | WO2011/007000 A1 * | 1/2011 |

* cited by examiner

HEADPHONE DEVICE, TERMINAL DEVICE, INFORMATION TRANSMITTING METHOD, AND HEADPHONE SYSTEM

TECHNICAL FIELD

This disclosure relates to a headphone device, a terminal device, a headphone system including them, further an information transmitting method of the terminal device, and a program which allows the terminal device to execute a process of an arithmetic processing device. This especially relates to parameter setting of a noise canceling process in the headphone device.

CITATION LIST

Patent Documents

Patent Document 1: JP 2008-122729 A
Patent Document 2: JP 2008-116782 A
Patent Document 3: JP 2008-250270 A

BACKGROUND ART

As disclosed in Patent Documents 1, 2, and 3 described above, a noise canceling system which reduces noise of an external environment by a headphone used with a portable audio player and the like to provide an excellent reproduced sound space in which external noise is reduced to a listener is known.

SUMMARY OF THE INVENTION

Problems to be Solved by the Invention

An example of this type of noise canceling system is an active type noise reducing system which actively reduces the noise basically provided with a following configuration.

That is, the external noise (noise) is picked up by a microphone as acoustic-electric converting means and a noise canceling signal having a phase acoustically reverse to that of the noise is generated from an audio signal of the picked up noise. The noise canceling signal is synthesized with an audio signal to be originally listened to such as music and is acoustically reproduced by a speaker. According to this, the noise from outside is acoustically cancelled out and the noise is reduced.

Herein, a digital filtering process is used for generating the noise canceling signal; a filter property thereof is changed according to an ambient environment, so that optimal noise cancellation according to an ambient noise condition may be realized.

For this, however, it is required to analyze the ambient noise condition and obtain the filter property (for example, a coefficient parameter) suitable for a property thereof, so that this requires operation with a large process burden. Therefore, there is a problem that high arithmetic capacity is required in the headphone device or operating time of the headphone device normally driven by a battery decreases by increase in power consumption.

Therefore, an object of this disclosure is to provide technology which realizes optimal noise canceling process while reducing the process burden of the headphone device.

Solution to Problems

A headphone device of this disclosure is provided with a driver unit which outputs a sound; a microphone which picks up at least a sound from outside; a noise canceling processor which performs a filtering process for an audio signal picked up by the microphone to generate a noise canceling signal, synthesizes the noise canceling signal with an input audio signal to obtain an output audio signal, and supplies the output audio signal to the driver unit; a communicating unit which communicates with an external terminal device; and a controller which performs a setting process of a processing parameter for the filtering process of the noise canceling processor based on indication information transmitted from the terminal device and received by the communicating unit.

A terminal device of this disclosure is provided with a microphone which picks up at least a sound from outside; a communicating unit which communicates with an external headphone device; and a controller/arithmetic unit which performs noise analysis for an audio signal picked up by the microphone, generates indication information to indicate a processing parameter related to a noise canceling process in the headphone device from a noise analysis result, and performs a process to transmit the indication information from the communicating unit to the headphone device.

An information transmitting method of a terminal device of this disclosure performs noise analysis for an audio signal picked by a microphone which picks up at least a sound from outside; generates indication information to indicate a processing parameter related to a noise canceling process in an external headphone device from a result of the noise analysis; and transmits the indication information to the headphone device.

A program of this disclosure is a program which allows an arithmetic processing device in a terminal device to execute: a process to perform noise analysis for an audio signal picked up by a microphone which picks up at least a sound from outside; a process to generate indication information to indicate a processing parameter related to a noise canceling process in an external headphone device from a noise analysis result; and a process to transmit the indication information to the headphone device.

A terminal device of this disclosure is provided with a position detecting unit which detects current position information; a communicating unit which communicates with an external headphone device; and a controller/arithmetic unit which generates indication information to indicate a processing parameter related to a noise canceling process in the headphone device based on the current position information detected by the position detecting unit and performs a process to transmit the indication information from the communicating unit to the headphone device.

An information transmitting method of a terminal device of this disclosure obtains current position information from a position detecting unit which detects the current position information; generates indication information to indicate a processing parameter related to a noise canceling process in an external headphone device based on the current position information; and transmits the indication information to the headphone device.

A program of this disclosure is a program which allows an arithmetic processing device in a terminal device to execute: a process to obtain current position information from a position detecting unit which detects the current position information; a process to generate indication information to indicate a processing parameter related to a noise canceling process in an external headphone device based on the current position information; and a process to transmit the indication information to the headphone device.

The headphone system of this disclosure includes the above-described headphone device and the above-described terminal device.

The technology of this disclosure is to allow the terminal device side to execute a parameter determining process for the noise canceling process based on the noise analysis and position information for improving operating time of the headphone device.

That is, the terminal device side generates the indication information to indicate the processing parameter related to the noise canceling process in the headphone device based on the noise analysis result and the current position information and transmits the indication information to the headphone device. The headphone device performs a setting process of the processing parameter for the filtering process of the noise canceling processor based on the received indication information. According to this, a burden of a processing resource on the headphone device side is reduced.

EFFECTS OF THE INVENTION

According to this disclosure, the processing resource burden on the headphone device side may be reduced, and according to this, there is an effect in which it is possible to eliminate a need for an arithmetic function with high processing ability at the time of automatic optimization of the noise canceling process thereby to reduce the power consumption.

MODE FOR CARRYING OUT THE INVENTION

Hereinafter, embodiments are described in the following order.
<1. Description of Noise Canceling Technology>
[1-1 Feedback Type]
[1-2 Feedforward Type]
[1-3 Combined System]
[1-4 Filter Coefficient Optimization]
<2. Headphone System of Embodiment>
<3. First Embodiment (Noise Analysis)>
<4. Second Embodiment (Noise Analysis)>
<5. Third Embodiment (Stream Transmission)>
<6. Fourth Embodiment (Position Detection)>
<7. Fifth Embodiment (Example of Various Combined Detection)>
<8. Uploading System>
<9. Program>
<10. Modification>

Meanwhile, the term "headphone" in the embodiments and claims is a collective term for a device which a user wears in his/her ear for listening, including a type worn in an auricle or an ear hole, a so-called "earphone", as well as a headset type worn on a head.

Hereinafter, the term "noise cancellation" is sometimes abbreviated as "NC" for the purpose of description.

<1. Description of Noise Canceling Technology>

First, before the embodiments are described, a noise canceling (NC) system applied to a headphone device is described with reference to FIGS. 19 to 24.

A system which performs active noise reduction includes a feedback type (FB type) and a feedforward type (FF type).

A type to change a noise canceling property according to a noise environment includes two types: a manual selection type to change according to a selection instruction by the user and an automatic change type to automatically change the property according to the noise environment.

Hereinafter, both of them are described.

[1-1 Feedback Type]

Figure 19:
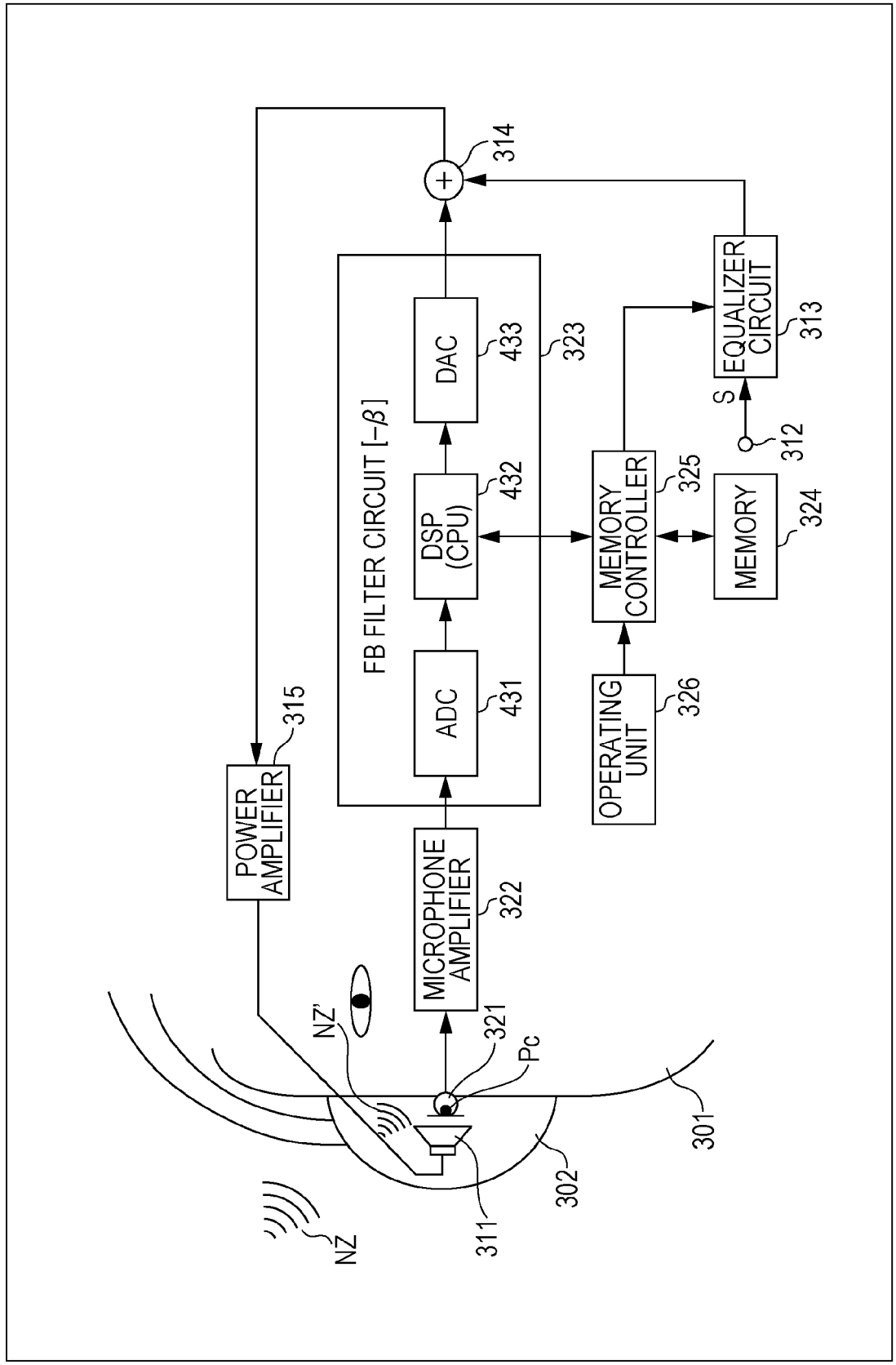
FIG. 19 is an illustrative diagram of a feedback type noise canceling system.

First, a feedback type NC system is described. FIG. 19 is a block diagram of a configuration example of the headphone to which the NC system is applied.

Figure 1:
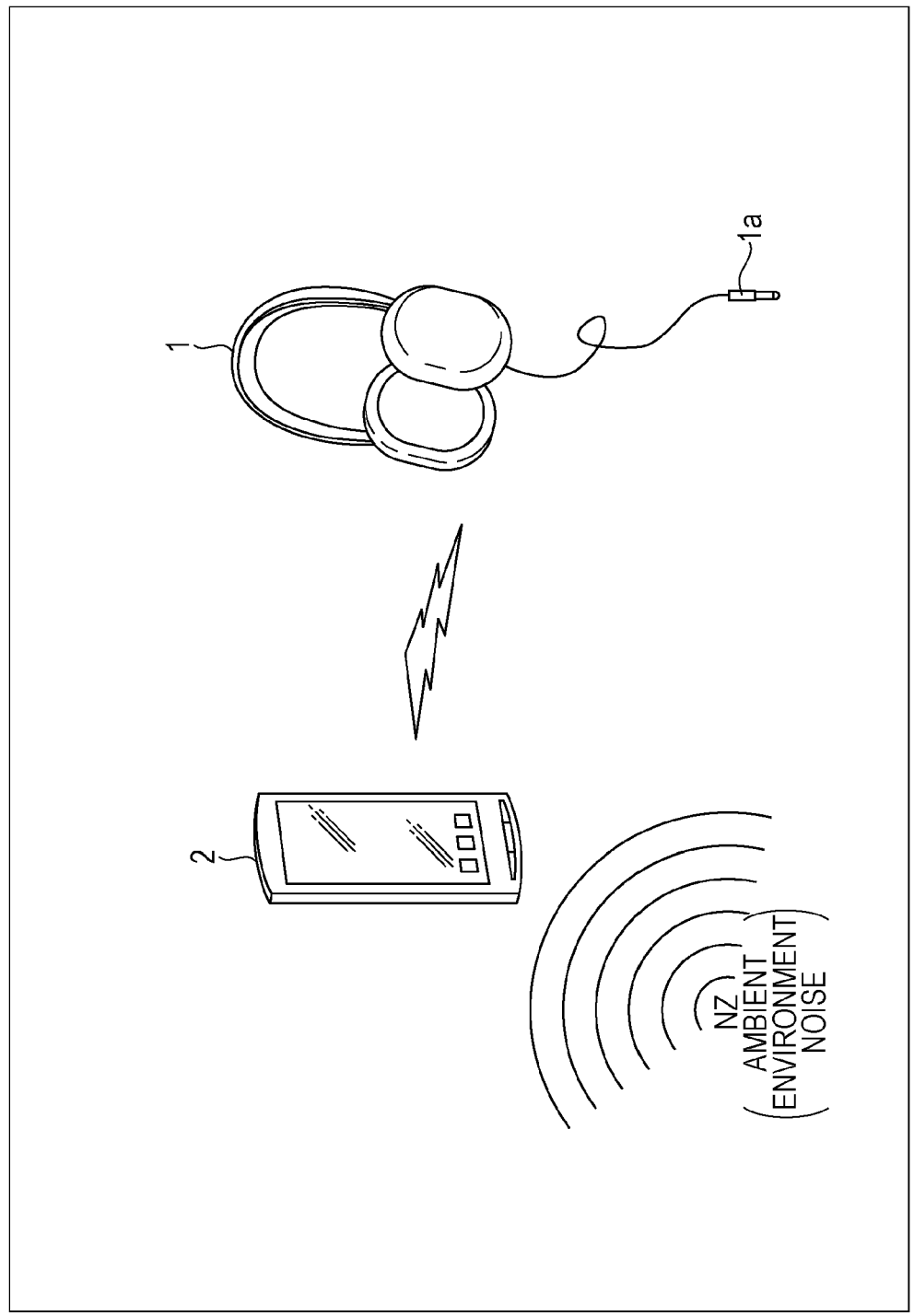
FIG. 1 is an illustrative diagram of a headphone system of an embodiment of this disclosure.

Meanwhile, in FIG. 1, a configuration of only a portion on a right-ear side of a listener 301 of the headphone device is illustrated for simplifying the description. The same applies to following FIGS. 21, 23, and 24 and the embodiments to be described later. Meanwhile, it goes without saying that a portion on a left-ear side is similarly configured.

FIG. 19 illustrates a state in which the listener 301 wears the headphone device and a right ear of the listener 301 is covered with a right-ear headphone housing (housing unit) 302. A headphone driver unit (hereinafter, simply referred to as a driver unit) 311 as an electric-acoustic converting means for acoustically reproducing an audio signal being an electric signal is provided within the headphone housing 302.

An input audio signal S (for example, a music signal) through an audio signal input terminal 312 is supplied through an equalizer 313 and an adder 314 to a power amplifier 315 as an output audio signal. The audio signal through the power amplifier 315 is supplied to the driver unit 311 to be acoustically reproduced and reproduced sound is emitted to the right ear of the listener 301.

The audio signal input terminal 312 is formed of a headphone plug plugged into a headphone jack of a portable music reproducing device, for example.

It is configured that a noise canceling circuit unit provided with a microphone 321, a microphone amplifier (hereinafter, simply referred to as a mic amp) 322, a FB (feedback) filter circuit 323 for noise cancellation, a memory 324, a memory controller 325, an operating unit 326 and the like is provided as illustrated in addition to the equalizer 313, the adder 314, and the power amplifier 315 on an audio signal transmission channel between the audio signal input terminal 312 and the right-ear and left-ear driver units 311.

In the configuration in FIG. 19, in a music listening environment of the listener 301, noise NZ' entering a music listening position of the listener 301 within the headphone housing 302 out of noise NZ outside the headphone housing 302 is reduced by the feedback type such that the music may be listened to in an excellent environment.

In the feedback type NC system, noise is picked up in an acoustic synthesis position (noise canceling point Pc) in which the noise and the acoustically reproduced sound of the audio signal are synthesized with each other being the music listening position of the listener 301.

Therefore, the microphone 321 for noise pickup is provided at the noise canceling point Pc within the headphone housing (housing unit) 302. The sound in the position of the microphone 321 becomes a control point, so that the noise canceling point Pc is normally located in a position near the ear, that is, in front of a diaphragm of the driver unit 311 in consideration of a noise attenuating effect, and the microphone 321 is arranged in this position.

It is configured to generate a reverse phase component of the noise NZ' picked up by the microphone 321 as a noise canceling signal by the FB filter circuit 323 and supply the generated noise canceling signal to the driver unit 311 to acoustically reproduce the same, thereby reducing the noise NZ' externally entering the headphone housing 302.

The FB filter circuit 323 which generates the noise canceling signal includes a DSP (digital signal processor) 432, an A/D converting circuit 431 provided on a preceding stage thereof, and a D/A converting circuit 433 provided on a subsequent stage thereof.

An analog audio signal picked up by the microphone 321 is supplied to the FB filter circuit 323 through the microphone amplifier 322 to be converted to a digital audio signal by the A/D converting circuit 431. Then, the digital audio signal is supplied to the DSP 432.

A digital filter for generating a feedback type digital noise canceling signal is formed in the DSP 432. The digital filter generates the digital noise canceling signal having a property according to a filter coefficient as a parameter set for the same from the digital audio signal input thereto. The filter coefficient set for the digital filter of the DSP 432 is supplied from the memory 324 through the memory controller 325 in a case of this example.

The memory 324 stores the filter coefficients as a plurality of (plurality of sets of) parameters to be described later such that the noise in a plurality of various different noise environments may be reduced by the noise canceling signal generated by the digital filter of the DSP 432.

The memory controller 325 reads a specific one (one set of) filter coefficient from the memory 324 and sets the same for the digital filter of the DSP 432.

In a case of this configuration example, an operation output signal of the operating unit 326 is supplied to the memory controller 325. The memory controller 325 selects the specific one (one set of) filter coefficient from the memory 324 to read according to the operation output signal from the operating unit 326 and sets the same for the digital filter of the DSP 432.

The digital filter of the DSP 432 generates the digital noise canceling signal according to the filter coefficient selectively read from the memory 324 to be set through the memory controller 325 in the above-described manner.

The generated digital noise canceling signal is converted to an analog noise canceling signal by the D/A converting circuit 433. Then, the analog noise canceling signal is supplied to the adder 314 as an output signal of the FB filter circuit 323.

As described above, the input audio signal (music signal and the like) S to which the listener 301 wants to listen is supplied to the adder 314 through the audio signal input terminal 12 and the equalizer 313. The equalizer 313 corrects sound quality of the input audio signal.

An output of the equalizer 313 and the noise canceling signal from the FB filter circuit 323 are synthesized with each other by the adder 314 and supplied to the driver unit 311 through the power amplifier 315 as the output audio signal to be acoustically reproduced.

An acoustically reproduced component by the noise canceling signal generated by the FB filter circuit 323 is included in the reproduced sound. The acoustically reproduced component by the noise canceling signal and the noise NZ' are acoustically synthesized with each other, so that the noise NZ' is reduced (canceled) at the noise canceling point Pc.

Feedback type noise canceling operation described above is described with reference to FIG. 20 by using transfer functions.

Figure 20:
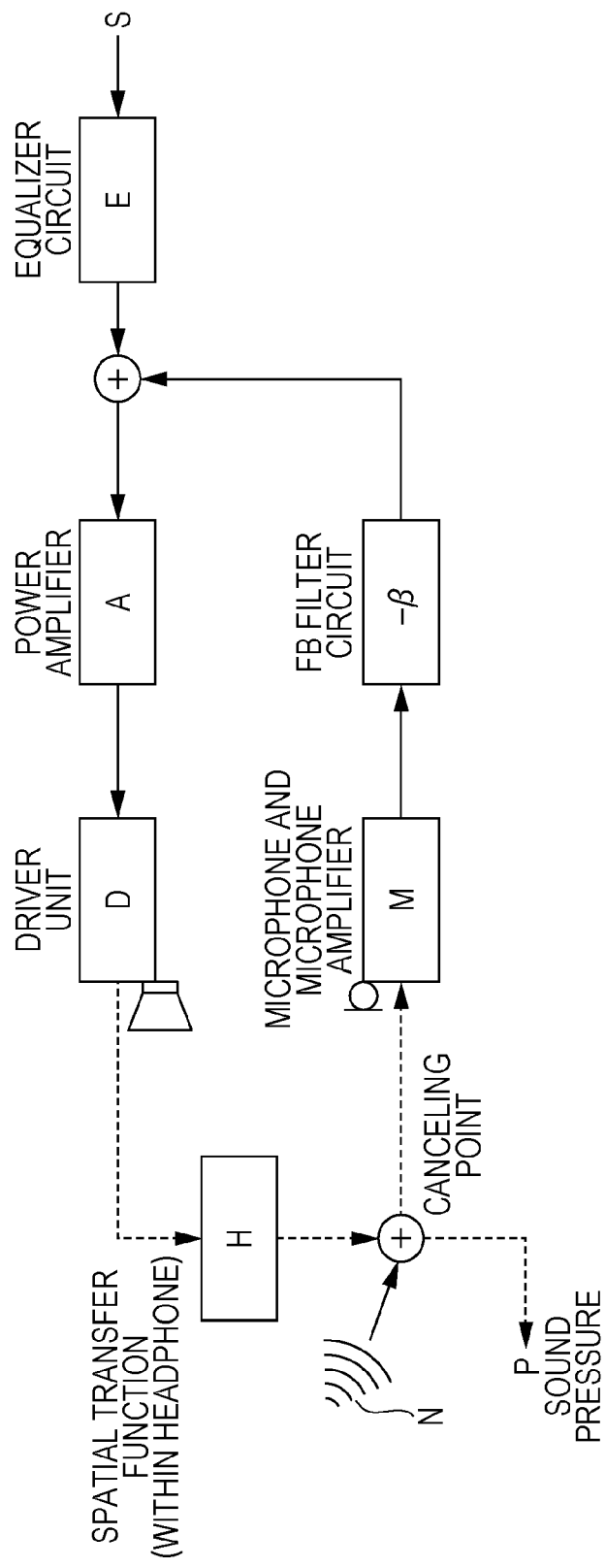
FIG. 20 is an illustrative diagram of a feedback type transfer function.

FIG. 20 is a block diagram of each unit illustrated in FIG. 19 represented by using the transfer function thereof. In FIG. 20, "A" represents the transfer function of the power amplifier 315, "D" represents the transfer function of the driver unit 311, "M" represents the transfer function corresponding to a portion of the microphone 321 and the microphone amplifier 322, and "−β" represents the transfer function of the filter designed for feedback. "H" represents the transfer function of a space from the driver unit 311 to the microphone 321 and "E" represents the transfer function of the equalizer 313 applied to the audio signal S to be listened to. Each of the above-described transfer functions is represented as complex representation.

In FIG. 20, "N" represents the noise entering a position near the microphone 321 within the headphone housing 302 from an external noise source and "P" represents a sound pressure arriving at the ear of the listener 301. Meanwhile, the external noise is transmitted into the headphone housing 302 because this leaks through a gap of an ear pad unit as the sound pressure or the sound is transmitted into the headphone housing 2 as a result of oscillation of the headphone housing 302 by the sound pressure, for example.

A transfer function block in FIG. 20 may be represented by following (Equation 1).

$$P = \{1/(1+ADHM\beta)\} \cdot N + \{AHD/(1+ADHM\beta)\} \cdot ES \quad \text{(Equation 1)}$$

In (Equation 1), when focusing on the noise N, it is understood that the noise N is attenuated to $1/(1+ADHM\beta)$. In this regard, following (Equation 2) should be satisfied for a system of (Equation 1) to stably operate as a noise canceling mechanism in a frequency band in which the noise is to be reduced.

$$|1/(1+ADHM\beta)|<1 \quad \text{(Equation 2)}$$

Next, a case in which a required sound is reproduced from the driver unit of the headphone in addition to the above-described noise reducing function is described.

Meanwhile, the audio signal S being a listening target in FIG. 20 is actually a general term for signals which should be originally reproduced by the driver unit of the headphone such as a sound of the microphone outside the housing (used as acoustic aid) and an acoustic signal through communication (used as the headset) in addition to the music signal.

In (Equation 1) described above, when focusing on the signal S, if the equalizer E is set as represented by (Equation 3), the sound pressure P is represented as (Equation 4).

$$E=(1+ADHM\beta) \quad \text{(Equation 3)}$$

$$P=\{1/(1+ADHM\beta)\} \cdot N + ADHS \quad \text{(Equation 4)}$$

Therefore, when the position of the microphone 321 is very close to the ear position, H represents the transfer function from the driver unit 311 to the microphone 321 (ear) and A and D represent the transfer functions of properties of the power amplifier 315 and the driver unit 311, respectively, so that it is understood that the property similar to that of a normal headphone without the noise reducing function may be obtained. Meanwhile, at that time, a transfer property E of the equalizer 313 is the property substantially equivalent to an open loop property on a frequency axis.

As is understood from above, it is possible to listen to the acoustic signal being the listening target without any problem while reducing the noise by using the headphone device having the configuration illustrated in FIG. 19. In this regard, it is necessary that the filter coefficient according to a property of the noise being the external noise NZ transmitted into the headphone housing 302 is set for the digital filter formed in the DSP 432 in order to obtain a sufficient noise reducing effect in this case.

As described above, there are various noise environments in which the noise is generated and a frequency property and a phase property of the noise correspond to the noise environments. Therefore, the sufficient noise reducing effect cannot be expected in all the noise environments by using a single filter coefficient.

Therefore, it is configured, for example, that a plurality of (a plurality of sets of) filter coefficients according to the various noise environments are prepared in a manner stored in the memory 324 in advance, and a filter coefficient considered to be appropriate is selected from the plurality of filter coefficients to be read and set for the digital filter formed in the DSP 432 of the FB filter circuit 323.

It is desirable to pick up the noise in each of the various noise environments and calculate the appropriate filter coefficient capable of reducing (canceling) the noise in advance to store in the memory 324 as the filter coefficient to be set for the digital filter. For example, the noise in the various noise environments such as at a platform of a station, at an airport, in an airplane, in a train moving on the ground, in a subway, in a bus, at a crowd of a street, and in a large-scale shop is picked up and the appropriate filter coefficient capable of reducing the noise is calculated in advance to be stored in the memory 324.

The memory controller 325 selects the appropriate filter coefficient from a plurality of (plurality of sets of) filter coefficients stored in the memory 324 according to operation of the user by using the operating unit 326.

For example, it is configured that each set of the filter coefficients is made a subway mode, an airplane mode, a bus mode, a crowd mode and the like (for the purpose of description, they are collectively referred to as an "NC mode") such that the user may select the mode by the operation. Therefore, the user may indicate an optimal filter coefficient according to a current noise environment. For example, when the user takes the subway, the user indicates the subway mode as the NC mode. According to this, the filter coefficient of the subway mode is set for the digital filter formed in the DSP 432 and a noise canceling effect in the subway may be optimized.

[1-2 Feedforward Type]

Next, the headphone device which performs feedforward type noise cancellation is described with reference to FIGS. 21 and 22. Meanwhile, the same reference sign is assigned to the same portion as that in FIG. 19 and the description thereof is omitted.

In this case, in the music listening environment of the listener 301, the noise entering the music listening position of the listener 301 within the headphone housing 302 out of the noise NZ outside the headphone housing 302 is reduced by the feedforward type such that the music may be listened to in the excellent environment.

In a feedforward type noise canceling system, a microphone 331 is basically arranged outside the headphone housing 302 and an appropriate filtering process is performed to the noise NZ picked up by the microphone 331 to generate the noise canceling signal. The generated noise canceling signal is acoustically reproduced by the driver unit 311 and the noise NZ' is cancelled in the vicinity of the ear of the listener 301.

The noise NZ picked up by the microphone 331 and the noise NZ' in the headphone housing 302 have different properties according to difference in spatial position between them (including difference between outside and inside of the headphone housing 2). Therefore, in the feedforward type, the noise canceling signal is generated by taking into account difference in spatial transfer function between the noise NZ picked up by the microphone 331 and the noise NZ' at the noise canceling point Pc.

A feedforward type noise canceling signal is generated by a FF (feedforward) filter circuit 333.

The FF filter circuit 333 includes a DSP 442, an A/D converting circuit 441 provided on a preceding stage thereof, and a D/A converting circuit 443 provided on a subsequent stage thereof as in the case of the above-described FB filter circuit 323.

The analog audio signal picked up by the microphone 331 is supplied to the FF filter circuit 333 through the microphone amplifier 332 to be converted to the digital audio signal by the A/D converting circuit 441. Then, the digital audio signal is supplied to the DSP 442.

In the DSP 442, the digital filter for generating a feedforward type digital noise canceling signal is formed. The digital filter generates the digital noise canceling signal having the property according to the filter coefficient as the parameter to be set from the input digital audio signal. The filter coefficient set for the digital filter of the DSP 442 may be supplied from the memory 324 through the memory controller 325, for example, as in the above-described example in FIG. 19.

For example, the filter coefficient of the NC mode (subway mode and the like) selected according to the user operation is set.

The digital noise canceling signal generated by the DSP 442 is converted to the analog noise canceling signal by the D/A converting circuit 443. Then, the analog noise canceling signal is supplied to the adder 314 as the output signal of the FF filter circuit 333.

The noise canceling signal and the audio signal S through the audio signal input terminal 312 and the equalizer 313 are synthesized with each other by the adder 314 to be supplied to the power amplifier 315. This is acoustically reproduced from the driver unit 311.

The acoustically reproduced component by the noise canceling signal generated by the FF filter 333 is included in the reproduced sound. The acoustically reproduced component by the noise canceling signal and the noise NZ' are acoustically synthesized with each other, so that the noise NZ' is reduced (canceled) at the noise canceling point Pc.

As described above, feedforward type noise canceling operation is realized.

Meanwhile, although the configuration of the FF filter circuit 333 is similar to that of the FB filter circuit 323 illustrated in FIG. 19, the filter coefficient supplied to the digital filter formed in the DSP 442 is of the feedforward type different from the filter coefficient supplied to the digital filter formed in the DSP 432 of the feedback type.

Figure 21:
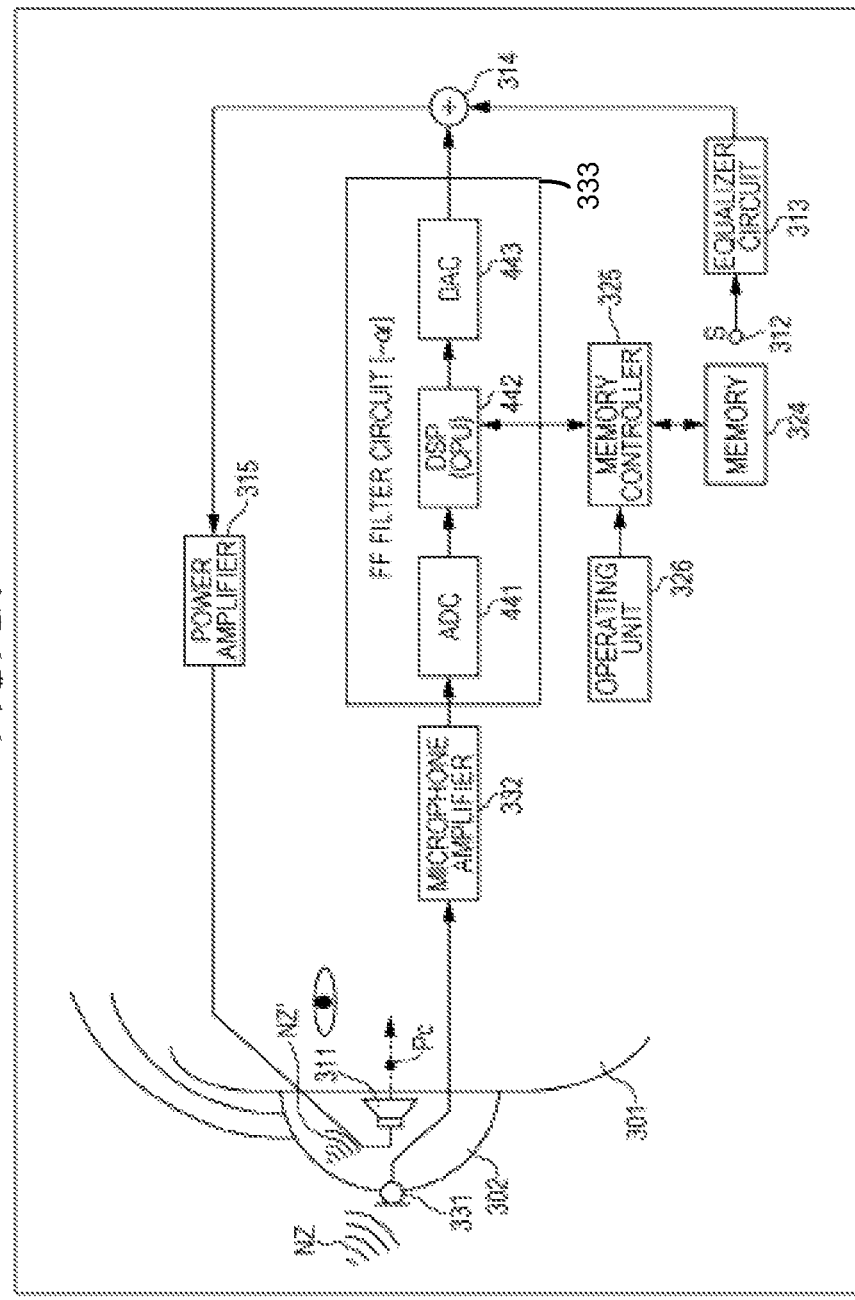
FIG. 21 is an illustrative diagram of a feedforward type noise canceling system.
Figure 22:
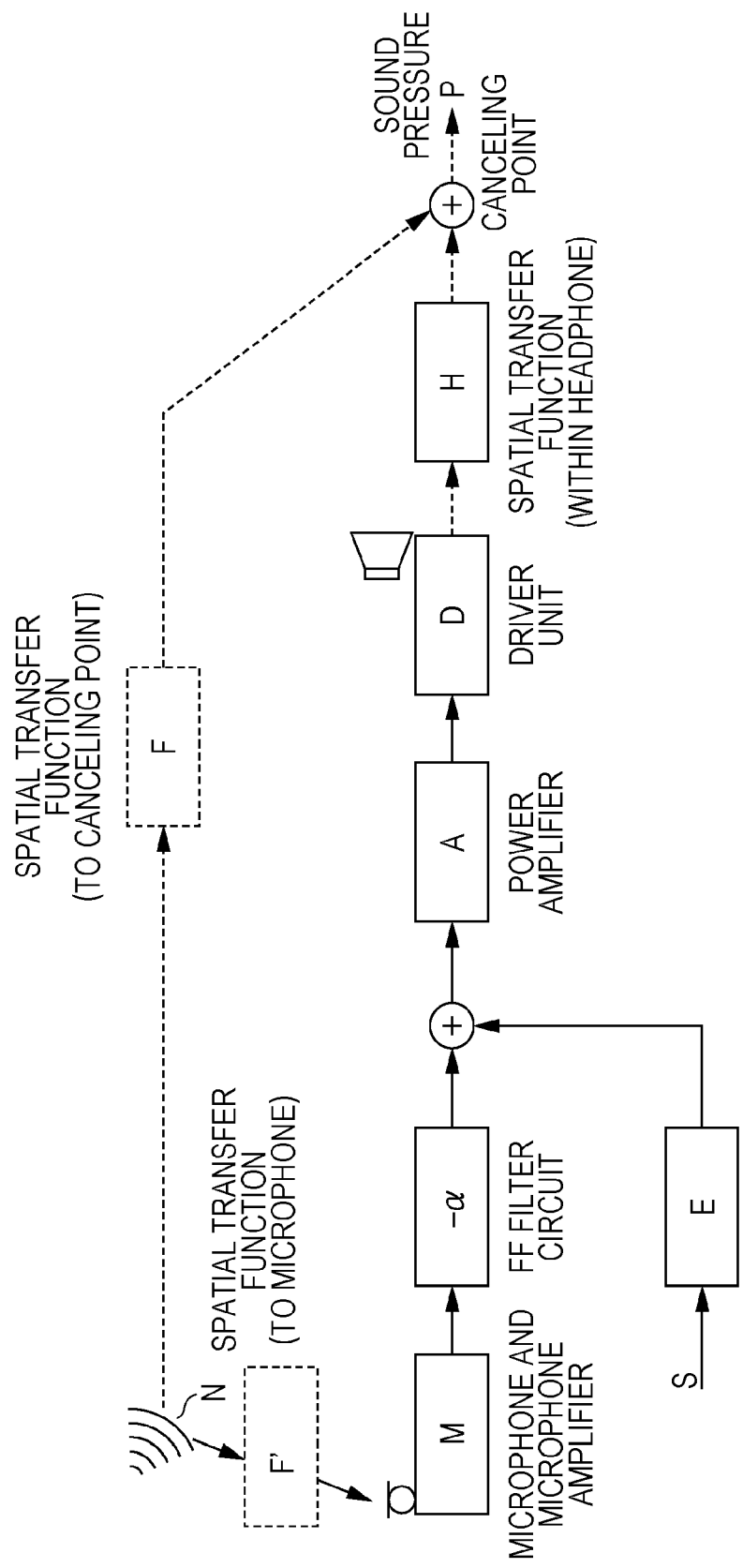
FIG. 22 is an illustrative diagram of a feedforward type transfer function.

Feedforward type noise reducing operation is illustrated in FIG. 22 by using the transfer functions corresponding to FIG. 21.

In the drawing, "A" (the transfer function of the power amplifier 315), "D" (the transfer function of the driver unit 311), "H" (the transfer function of the space from the driver unit 311 to the canceling point Pc), "E" (the transfer function of the equalizer 313 applied to the audio signal S to be listened to), and "P" (the sound pressure arriving at the ear of the listener 301) are similar to those illustrated in FIG. 20 above.

"M" represents the transfer function corresponding to a portion of the microphone 331 and the microphone amplifier 332 and "−α" represents the transfer function of the filter designed for feedforward. "F" represents the transfer function from the position of the noise N of an external noise source 3 to the position of the canceling point Pc of the ear of the listener and "F'" represents the transfer function from the noise source to the position of the microphone 331. Each transfer function is represented as complex representation.

A transfer function block in FIG. 22 may be represented by following (Equation 5).

$$P=-F'ADHM\alpha N+FN+ADHS \quad \text{(Equation 5)}$$

Herein, supposing an ideal state, if the transfer function F may be represented as $F=-F'ADHM\alpha$ ... (Equation 6), (Equation 5) described above may be represented as $P=ADHS$ ... (Equation 7). That is, it is understood that the noise N is cancelled and only the music signal (or the music signal to be listened to and the like) S remains, so that the sound similar to that of normal headphone operation may be listened to.

Meanwhile, as is clear from the equation, (Equation 6) represents that the transfer function from the noise source to the ear position is mimicked by an electric circuit including the transfer function $\alpha$ of the digital filter.

Actually, however, it is difficult to form a perfect filter having the transfer function with which (Equation 6) described above is completely satisfied. Especially, in a mid-to-high range, the property might change due to large difference among individuals by a headphone wearing state and an ear shape, a noise position, a microphone position and the like. Therefore, in the mid-to-high range, the above-described active noise reducing process is not normally performed but passive sound isolation by the headphone housing 302 is often performed.

[1-3 Combined System]

Figure 23:
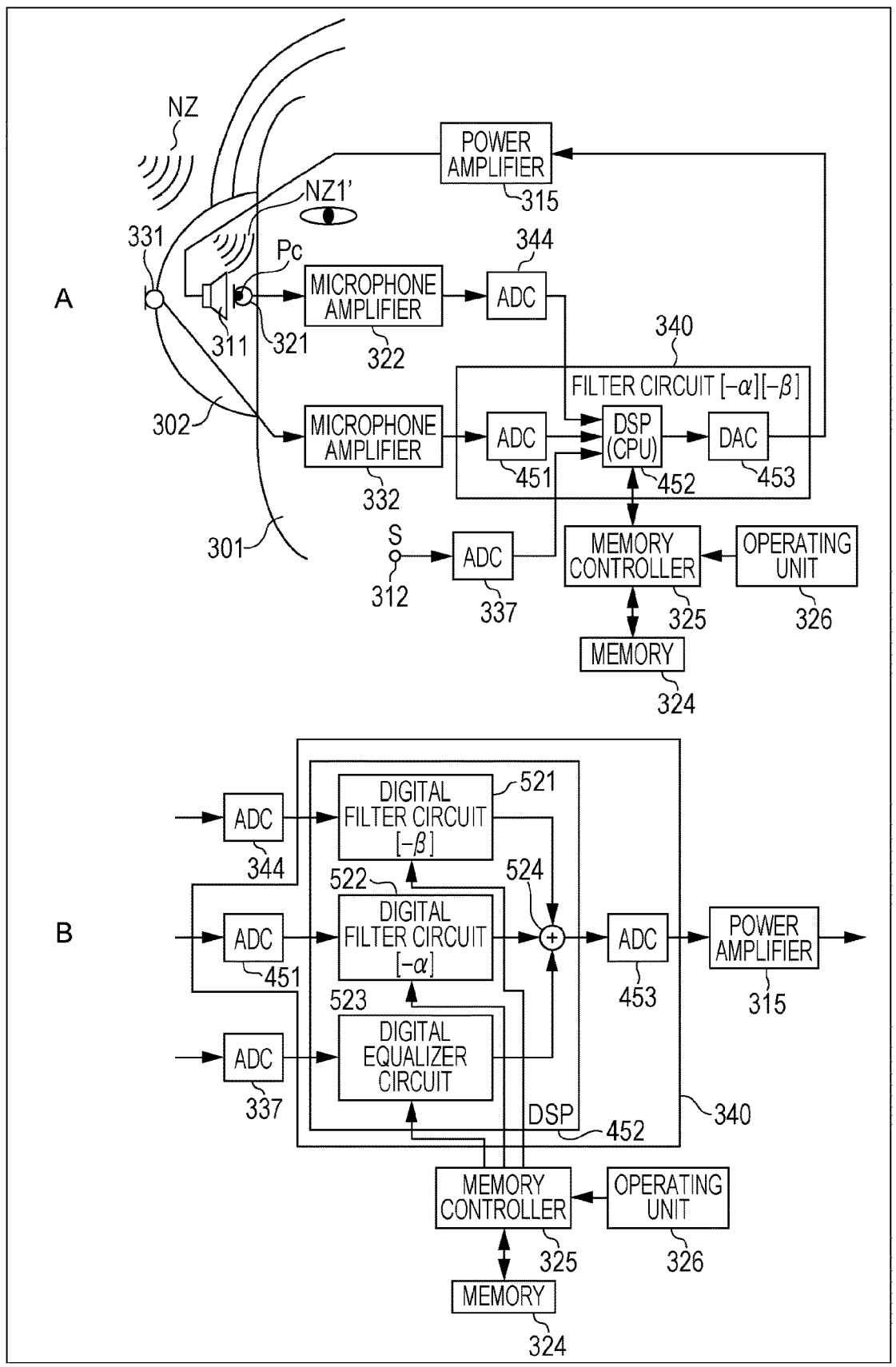
FIGS. 23A and 23B are illustrative diagrams of a combined type noise canceling system.

FIG. 23 illustrates a configuration example of the NC system equipped with both of a feedback system and a feedforward system. For the purpose of description, a case in which both of the feedforward type and the feedforward type are used is referred to as a combined type. Meanwhile, in FIG. 23, the same reference sign is assigned to the same portion as that in FIGS. 19 and 21 and the description thereof is omitted.

As illustrated in FIG. 23A, in this case, the microphone 321, the microphone amplifier 322, and the A/D converting circuit 344 are components of the feedback system, and the microphone 331, the microphone amplifier 332, and an A/D converting circuit 451 are components of the feedforward system.

Although it is possible that the filter circuit which generates the noise canceling signal is individually provided for the feedback system and the feedforward system, an example in which a filter circuit 340 which performs a process of both systems is used is herein described.

The filter circuit 340 includes the A/D converting circuit 451, a DSP 452, and a D/A converting circuit 453. In this case, the DSP 452 is configured to perform signal processing as the digital filter (−β) of the above-described FB filter circuit 323, the digital filter (−α) of the FF filter circuit 333, and further the equalizer 313 and the adder 314.

That is, the configuration realized by the DSP 452 is illustrated in detail in FIG. 23B; a feedback type filtering process is performed as a digital filter circuit 521 and the noise canceling signal is generated. Also, a feedforward type filtering process is performed as a digital filter circuit 522 and the noise canceling signal is generated. Further, the input audio signal S is made digital data by an A/D converting circuit 337 and is subjected to an equalizing process by a digital equalizer circuit 523 of the DSP 452.

The feedback type noise canceling signal generated by the digital filter circuit 521, the feedforward type noise canceling signal generated by the digital filter circuit 522, and the input audio signal subjected to the equalizing process by the digital equalizer circuit 523 are added by the adder 524 and is made the analog signal by the D/A converting circuit 453 to be supplied to the power amplifier 315. Then, this is acoustically output from the driver unit 311; in this case, noise canceling signal components of both types are included in the reproduced sound and the noise NZ' is reduced at the noise canceling point Pc.

In this case also, the filter coefficient sets according to the various environments are stored in the memory 324 as the filter coefficients in the digital filter circuits 521 and 522, and the noise reducing process suitable for the noise environment is realized by setting the filter coefficient according to the user operation using the operating unit 326.

[1-4 Filter Coefficient Optimization]

The feedback type, the feedforward type, and the combined type in which the filter coefficient is set according to the operation of the user are heretofore described; however, if the noise environment is automatically determined and the filter coefficient is automatically set, it is possible to always optimize the noise canceling operation while eliminating an operation burden of the user.

Figure 24:
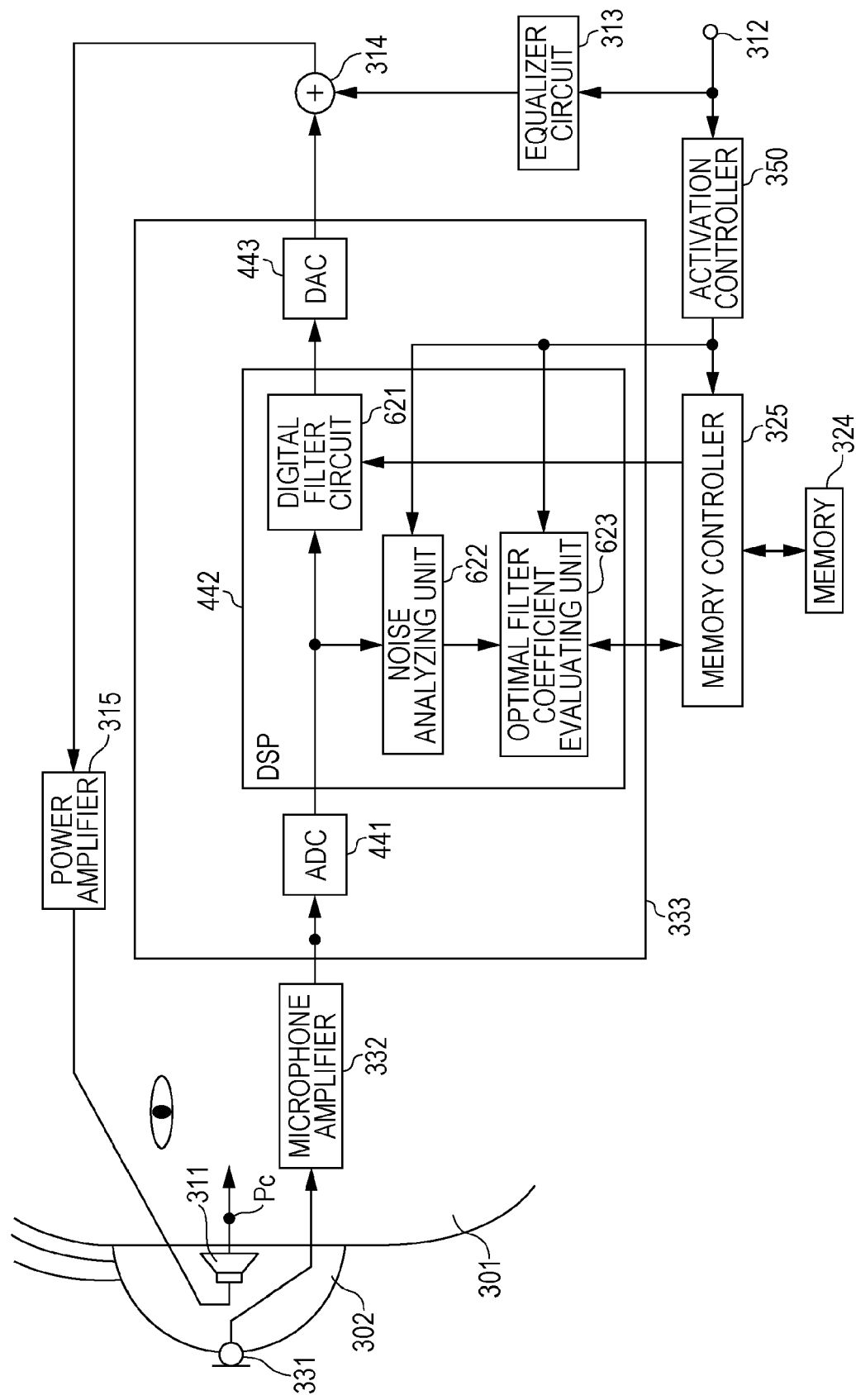
FIG. 24 is an illustrative diagram of a noise canceling system which performs filter coefficient optimization.

For example, FIG. 24 illustrates a case in which an automatic selecting method to be described hereinafter is adopted in place of the operating unit 326 in the configuration of the feedforward type in FIG. 21. The same reference sign is assigned to the same portion as that in FIG. 21.

In this case, the DSP 442 of the FF filter circuit 333 includes not only a feedforward type-compliant digital filter circuit 621 but also a noise analyzing unit 622 and an optimal property evaluating unit 623.

The noise analyzing unit 622 analyzes the property of the noise picked up by the microphone 331 and supplies an analysis result of the same to the optimal filter coefficient evaluating unit 623. For example, the optimal filter coefficient evaluating unit 623 selects the filter coefficient which realizes a noise reducing curve property the closest to a curve with a reverse property of a noise property curve based on the analysis result from the noise analyzing unit 622 out of the filter coefficients stored in the memory 324 and determines optimal one set of filter coefficients. Then, this passes along a determined result to the memory controller 325.

The memory controller 325 reads the filter coefficient set considered to be optimal from the memory 324 according to the determined result and sets the same for the digital filter circuit 621.

Meanwhile, such automatic optimal filter coefficient selecting/setting process may be performed in a silent period of the input audio signal S. Therefore, an activation controller 350 is provided and the activation controller 350 detects the silent period for the input audio signal S.

When the silent period is detected, the activation controller 350 transmits an activation control signal to the noise analyzing unit 622, the optimal filter coefficient evaluating unit 623, and the memory controller 325 and activates operation of the automatic selecting process of the optimal filter coefficient.

For example, such optimal filter coefficient automatic determination may be applied not only to the feedforward type NC system in FIG. 24 but also to the feedback type or combined type NC system. According to this, the user may effectively enjoy the noise reducing effect by the NC system without the operation burden.

However, when the optimal filter coefficient automatic determination is performed, there is a problem that high arithmetic capacity is required as an arithmetic processing device such as the DSP and a CPU as the process of the noise analyzing unit 622 to analyze an ambient noise condition and the process of the optimal filter coefficient evaluating unit 623 using a result thereof or that power consumption increases.

Therefore, this embodiment realizes optimization of a noise canceling process while reducing a process burden of the headphone device by various methods to be described hereinafter.

<2. Headphone System of Embodiment>

A basic configuration of a headphone system according to first to fifth embodiments to be described later is illustrated in FIG. 1.

In each embodiment, the headphone system is formed such that a headphone device 1 and a portable terminal 2 may communicate with each other as illustrated in FIG. 1.

The headphone device 1 being a headphone having a noise canceling function (including a case of a so-called earphone type) is a device which connects a plug 1a for audio signal input to a portable audio player and the like not illustrated to input an audio signal such as music and acoustically outputs the same to a listener who wears the headphone device 1, for example.

Meanwhile, as described later in the embodiments, the plug 1a (and a code) is not necessarily required and a mode in which the audio signal is input from the portable audio player, the portable terminal 2, or another device by wireless communication is also possible.

The portable terminal 2 is specifically a portable phone, a portable information processing device such as a PDA (personal digital assistant), a portable game machine, or a multifunctional portable phone with PDA function recently referred to as a smartphone and the like, for example.

The portable terminal 2 and the headphone device 1 are capable of communicating control information (indication information) and various signals such as a steam signal by using near field wireless communication (Bluetooth™, Wi-Fi (wireless fidelity) and the like), for example.

In a case of this embodiment, a noise canceling system provided within the headphone device 1 may be any one of the above-described feedback type, feedforward type, and combined type. Especially, the noise canceling system has a function to internally automatically set an optimal filter coefficient. In this embodiment, however, this does not have a function to determine the optimal filter coefficient.

On the other hand, the portable terminal 2 is provided with a function to analyze ambient noise, to detect a position and the like and further a function to determine the filter coefficient for generating an optimal noise canceling signal according to the same.

Then, the indication information related to the filter coefficient determination generated on the portable terminal 2 side is transmitted to the headphone device 1. The headphone device 1 provides a listening state under an optimized noise reducing effect to the listener by setting the filter coefficient in the NC system according to the received indication information.

That is, it is configured to reduce resources of a process and reduce power consumption in the headphone device 1 by using the portable terminal 2 normally carried by a user with the headphone device 1.

Especially, recently, the portable terminal 2 is able to execute a versatile UI (user interface) and abundant applications and is provided with various sensors. Basically, a condition of use is that the user always carries the portable terminal 2. In consideration of this, it may also be said that it is configured to effectively use the portable terminal 2 while the headphone device 1 is used.

<3. First Embodiment (Noise Analysis)>

A first embodiment is described with reference to FIGS. 2 to 6.

Figure 2:
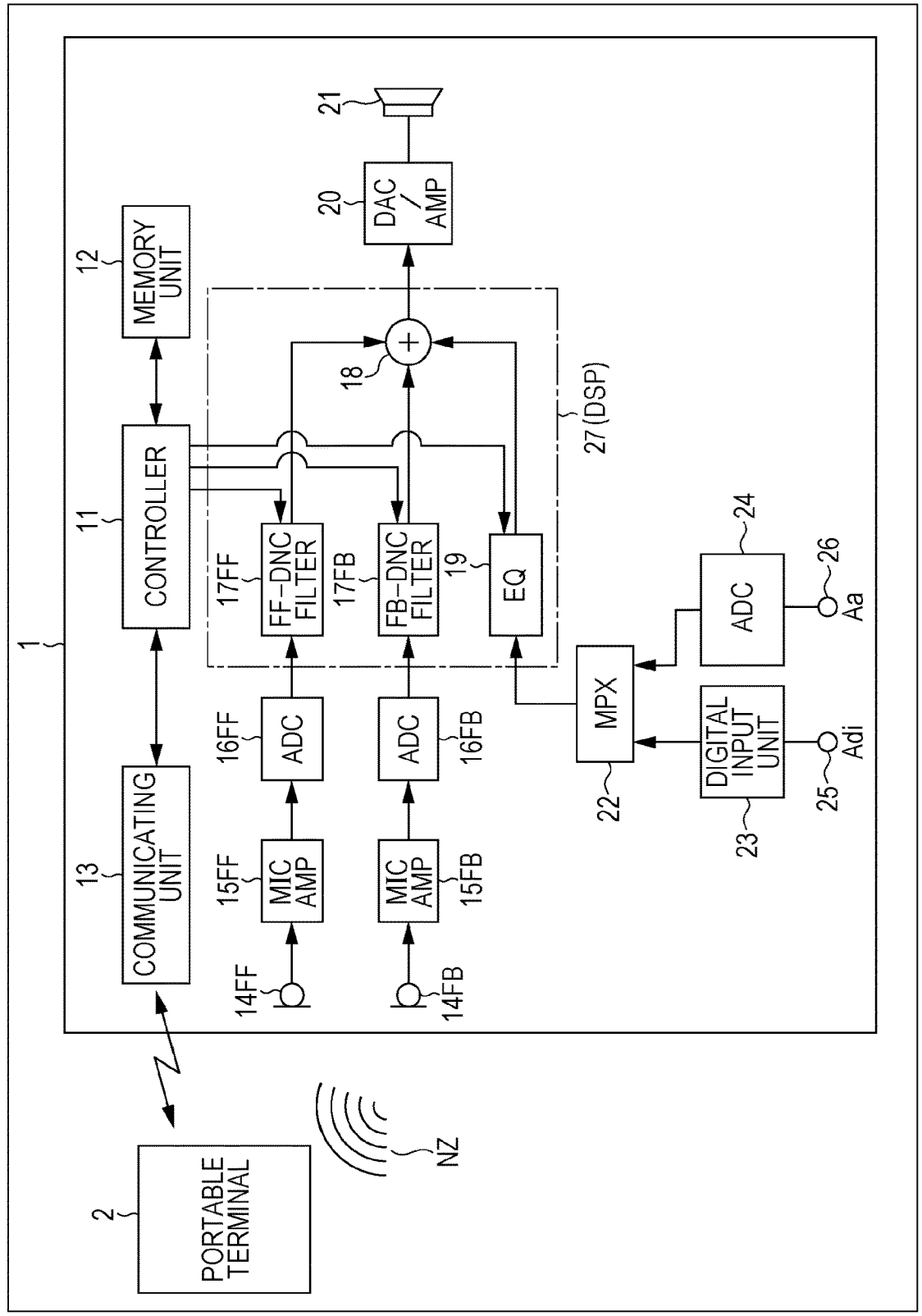
FIG. 2 is a block diagram of a headphone device of a first embodiment.

FIG. 2 is a block diagram of an inner configuration of a headphone device 1. Meanwhile, for convenience of illustration and for simple description, only one of right and left channels of a stereo audio signal (for example, only a component corresponding to a right ear of a user) is illustrated. The other channel side may also have the similar configuration. However, it is obvious that a component of a noise canceling system may also be shared by the right and left channels.

An example in which the headphone device 1 in FIG. 2 includes a digital input unit 23 and an A/D converter 24 basically as units of inputting an input audio signal such as music is described.

For example, from a music/audio source device (not illustrated) such as an audio player connected thereto, a digital audio signal Adi or an analog audio signal Aa is supplied as the input audio signal according to a connection mode thereof. Meanwhile, it may also be configured that only one of them is input.

The digital audio signal Adi input from a terminal 25 is subjected to a necessary process by the digital input unit 23 to be supplied to a multiplexer 22 as a digital audio signal. For example, in the digital input unit 23, a decoding process and the like according to a transmission format and the like of the digital audio signal is performed thereto and this is supplied to the multiplexer 22 as the digital audio signal as PCM linear audio data, for example.

The analog audio signal Aa input from a terminal 26 is converted to the digital audio signal, for example, the digital audio signal as the PCM linear audio data by the A/D converter 24 to be supplied to the multiplexer 22.

An equalizer 19 is provided in a DSP 27 as a signal processor which performs signal processing for the input audio signal.

The multiplexer 22 selects the digital audio signal (input audio signal) of any one of the digital input unit 23 and the A/D converter 24 and outputs the same to the equalizer 19 formed in the DSP 27. The equalizer 19 performs an equalizing process for sound quality correction and a sound quality effect process to the input audio signal.

An example in which the above-described combined type is adopted as an NC system in the headphone device 1 is described.

Therefore, this includes a microphone 14FF, a microphone amplifier 15FF, an A/D converter 16FF, and a FF-DNC (feedforward-digital noise canceling) filter 17FF as a noise canceling signal generating processing system for a feedforward type.

The microphone 14FF is provided so as to pick up external environment noise NZ outside a headphone housing as illustrated in FIG. 21. An audio signal picked up by the microphone 14FF to be input by the microphone amplifier 15FF is made a digital audio signal by the A/D converter 16FF to be supplied to the FF-DNC filter 17FF formed in the DSP 27. The FF-DNC filter 17FF being the digital filter for generating a feedforward type digital noise canceling signal and performs filtering corresponding to the above-described transfer function "−α".

This also includes a microphone 14FB, a microphone amplifier 15FB, an A/D converter 16FB, and a FB-DNC (feedback-digital noise canceling) filter 17FB as a noise canceling signal generating processing system for a feedback type.

The microphone 14FB is provided so as to pick up external environment noise NZ' arriving in the headphone housing (and a driver unit output sound) at a noise canceling point Pc within the headphone housing as illustrated in FIG. 19.

The audio signal picked up by the microphone 14FB to be input by the microphone amplifier 15FB is made the digital audio signal by the A/D converter 16FB to be supplied to the FB-DNC filter 17FB formed in the DSP 27. The FB-DNC filter 17FB being the digital filter for generating a feedback type digital noise canceling signal performs the filtering corresponding to the above-described transfer function "−β".

In the DSP 27, an adder 18 adds the input audio signal processed by the equalizer 19, the noise canceling signal generated by the FF-DNC filter 17FF, and the noise canceling signal generated by the FB-DNC filter 17FB to synthesize an output audio signal and supplies the same to a DAC/amplifier unit 20.

The DAC/amplifier unit 20 D/A converts the output audio signal to an analog audio signal and further performs a power amplifying process. Then, this supplies the output audio signal to the driver unit 21 and allows the driver unit 21 to execute an acoustic output.

As in the case described above with reference to FIG. 23, feedback type and feedforward type noise canceling signal components are included in a reproduced sound from the driver unit 21 and the reproduced sound related to the input audio signal such as the music is listened to by the listener in a state in which the noise NZ' is reduced at the noise canceling point Pc illustrated in FIG. 23.

Meanwhile, although the DAC/amplifier unit 20 D/A converts and performs an analog power amplifying process in this example, if the driver unit 21 is a so-called digital driver, a configuration of performing a digital amplifier process is also possible.

The headphone device 1 of this embodiment is further provided with a controller 11, a memory unit 12, and a communicating unit 13.

The controller 11 performs a process to set a filter coefficient of the FF-DNC filter 17FF in the DSP 27, the filter coefficient of the FB-DNC filter 17FB, and the filter coefficient of the equalizer 19.

The memory unit 12 stores the filter coefficient of the FF-DNC filter 17FF, the filter coefficient of the FB-DNC filter 17FB, and the filter coefficient of the equalizer 19 as processing parameters. For example, this stores various filter coefficient sets for realizing optimal noise cancellation according to an ambient environment so as to correspond to a subway mode, a bus mode, an airplane mode, and a crowd mode as an NC mode.

The communicating unit 13 performs data communication with the portable terminal 2 by wireless communication such as Bluetooth and Wi-Fi, for example.

Especially, the communicating unit 13 receives indication information of the NC mode transmitted from the portable terminal 2 and passes along the same to the controller 11. The controller 11 performs mode setting according to the input indication information of the NC mode. That is, this reads the filter coefficient set corresponding to the indicated NC mode from the memory unit 12 and sets the filter coefficient for the FF-DNC filter 17FF, the FB-DNC filter 17FB, and the equalizer 19.

The controller 11 also performs a controlling process for establishing communication with the portable terminal 2 by the communicating unit 13 and controls various pieces of data transmission.

Meanwhile, the configuration in FIG. 2 is an example. For example, although the DSP 27 is configured to have functions of the FF-DNC filter 17FF, the FB-DNC filter 17FB, the equalizer 19, and the adder 18, all or a part of circuit units may also be provided as an independent hardware circuit. Alternatively, one of or both of the A/D converters 16FF and 10FB may be made a component in the DSP 27.

Figure 3:
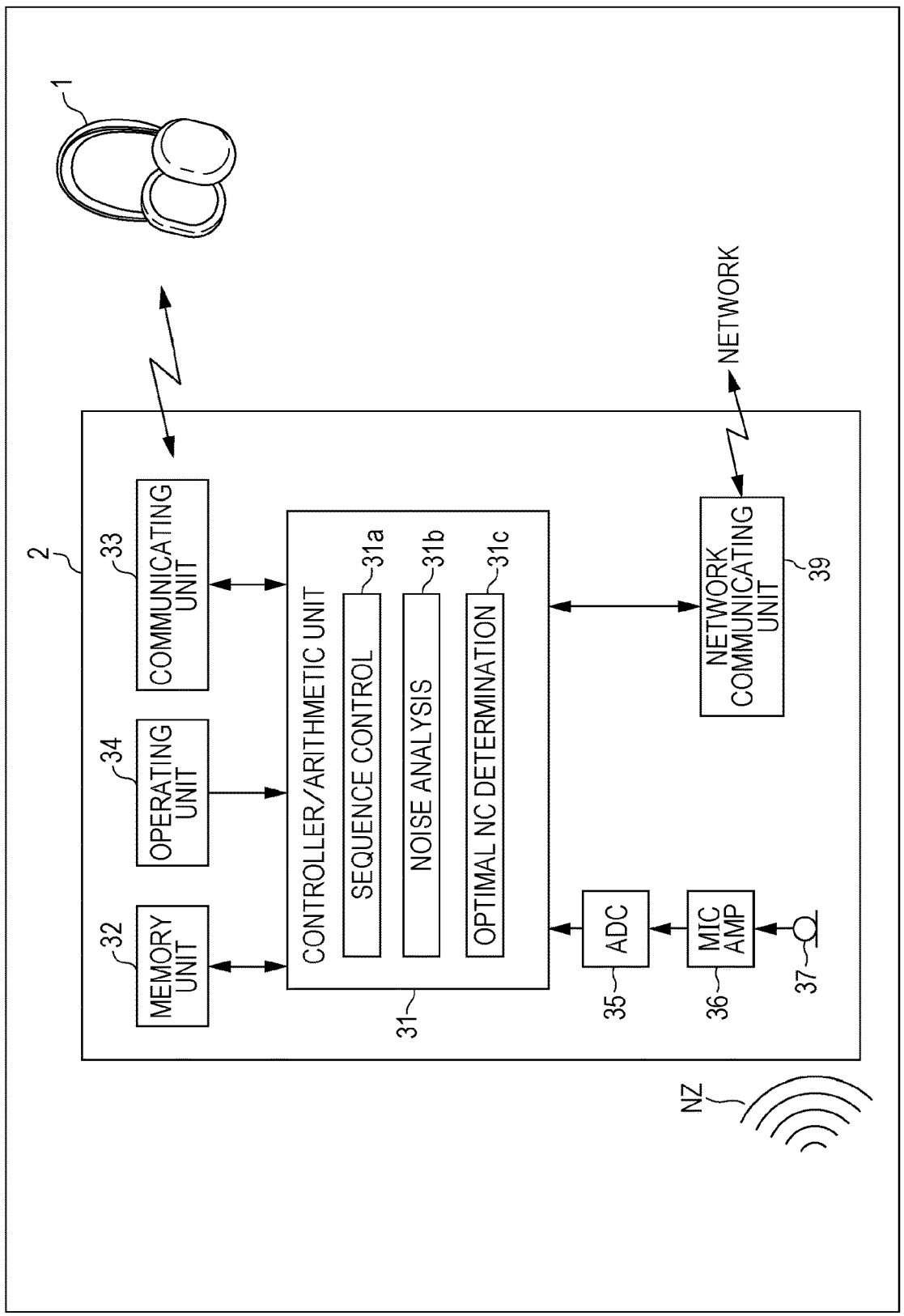
FIG. 3 is a block diagram of a portable terminal of the first embodiment.

FIG. 3 is an internal configuration example of the portable terminal 2. Meanwhile, as the portable terminal 2, a portable phone, a portable information processing device and the like are supposed as described above and there are various configurations according to the devices, but only a portion related to operation of this embodiment is herein illustrated.

The portable terminal 2 is provided with a controller/arithmetic unit 31, a memory unit 32, a communicating unit 33, an operating unit 34, an A/D converter 35, a microphone amplifier 36, a microphone 37, and a network communicating unit 39 as illustrated.

The microphone 37 picks up an ambient sound (including the ambient environment noise NZ). The microphone 37 may be the microphone originally mounted for another purpose such as a transmitter microphone for a portable phone function, for example, or a dedicated microphone for picking up the ambient noise.

An audio signal picked up by the microphone 37 is input to be amplified by the microphone amplifier 36 and is made digital data by the A/D converter 35 to be supplied to the controller/arithmetic unit 31.

The memory unit 32 comprehensively illustrating a storage unit such as a ROM (read only memory), a RAM (random access memory), and a flash memory stores various pieces of information and is used as a work area. Regarding the operation of this embodiment, this is used for storing an application program activated by the controller/arithmetic unit 31, an NC system database and the like. The NC system database is the database of a model name of the headphone device 1 and the like, the NC type adopted, the filter coefficients according to the various NC modes and the like.

Meanwhile, a HDD (hard disk drive), an optical disk, a memory card and the like may also be used as a storage medium which forms the memory unit 32.

The operating unit 34 inputs operation input information of the user and notifies the controller/arithmetic unit 31 of the same. Specifically, the operating unit 34 is realized as an operation key formed on a housing of the portable terminal 2, a touch panel on a display screen of the portable terminal 2 and the like.

The communicating unit 33 performs data communication with the headphone device 1 by the wireless communication such as the Bluetooth and Wifi, for example.

The network communicating unit 39 performs various types of communication through a network such as the Internet and a public telephone line.

For example, it is possible to download or update the application program and the database through the network communicating unit 39. For example, the above-described NC system database and application software as an NC process optimization program to be subsequently described may be downloaded from an external server and the like by using the network communicating unit 39.

The controller/arithmetic unit 31 formed of a CPU, a DSP and the like controls operation of each unit in the portable terminal 2 and performs arithmetic processing. For example, a process defined by the application program is executed by the controller/arithmetic unit 31, and according to this, the various functions as the portable phone and the information processing device are executed.

In a case of this embodiment, the application program (hereinafter, referred to as the "NC process optimization program") for an indication signal transmitting process to the headphone device 1 is activated, and according to this, functional blocks as a sequence controller 31a, a noise analyzing unit 31b, and an optimal NC determining unit 31c illustrated are realized as software functions in the controller/arithmetic unit 31.

The sequence controller 31a performs sequence control as the NC process optimization program. Specifically, this controls a noise analyzing process, an optimal NC determining process, a communicating process and the like according to definition of the NC process optimization program.

The noise analyzing unit 31b analyzes the noise NZ picked up by the microphone 37.

The optimal NC determining unit 31c determines an optimal NC mode in the NC system of the headphone device 1 from a noise analysis result.

A process for NC process optimization in the headphone device 1 and the portable terminal 2 illustrated in FIGS. 2 and 3 above is described with reference to FIG. 4.

Figure 4:
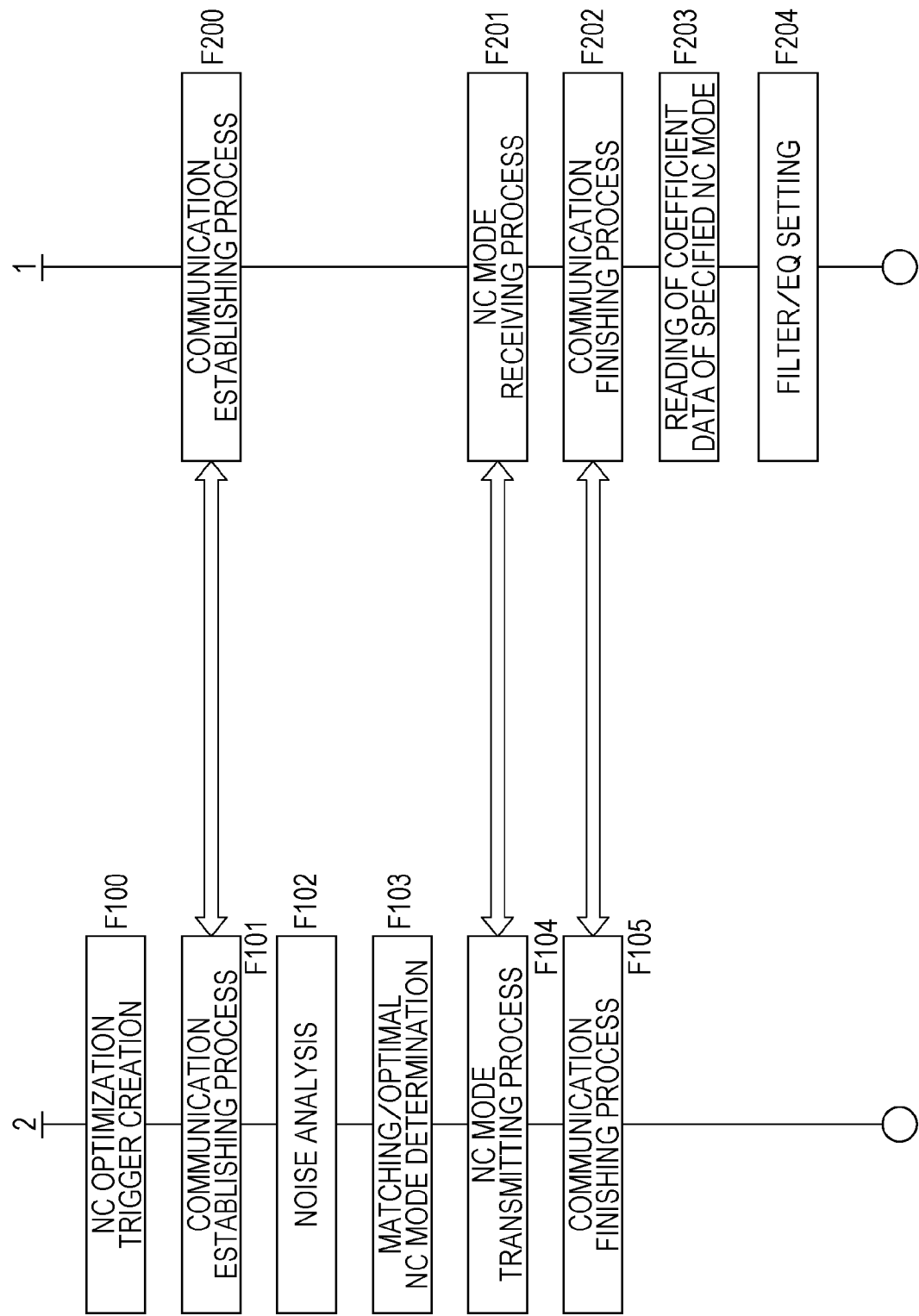
FIG. 4 is a flowchart of a parameter setting process of the first embodiment.

A process executed by the NC process optimization program by the controller/arithmetic unit 31 in the portable terminal 2 and a process of the controller 11 of the headphone device 1 performed in response to this are illustrated in FIG. 4.

At step F100, creation of a process execution trigger of the NC process optimization program is described as the process of the portable terminal 2. The NC process optimization program may be always activated, periodically activated, or activated by user operation, for example.

Further, this may be activated by determination of a certain condition by an automatic detecting process. For example, this may be activated when change in ambient noise condition, change in current position, change in temperature, change in atmospheric pressure, change in altitude, change in motion speed and the like are detected. Various examples regarding the activation are to be described later.

When an activation trigger is created at step F100, the controller/arithmetic unit 31 of the portable terminal 2 performs processes after step F101 according to the control of the sequence controller 31a (NC process optimization program).

First, the controller/arithmetic unit 31 performs a process to establish communication with the headphone device 1 by the communicating unit 33 at step F101. That is, a communication request is transmitted from the communicating unit 33 and a communication connection state is established with the communicating unit 13 of the headphone device 1. On the headphone device 1 side, the controller 11 controls to establish connection by the communicating unit 13 in response to the communication request from the portable terminal 2 at step F200.

That is, the controller/arithmetic unit 31 and the controller 11 establish the communication by transmitting/receiving the communication request and acknowledgement, and performing an authenticating process and the like through the communicating units 33 and 13. Since the communication is established, a process to notify the portable terminal 2 side of the model name of the headphone device 1, the NC system information and the like is also performed between the controller/arithmetic unit 31 and the controller 11. The communication of the model name, the NC system information and the like is performed for the controller/arithmetic unit 31 side to grasp the NC mode executable in the headphone device 1 with which this communicates.

Subsequently, the controller/arithmetic unit 31 of the portable terminal 2 performs the noise analyzing process by the function as the noise analyzing unit 31b at step F102.

Then, at step F103, this performs the determining process of the optimal NC mode which should be selected by the headphone device 1 based on the noise analysis result by the function of the optimal NC determining unit 31c.

Figure 5:
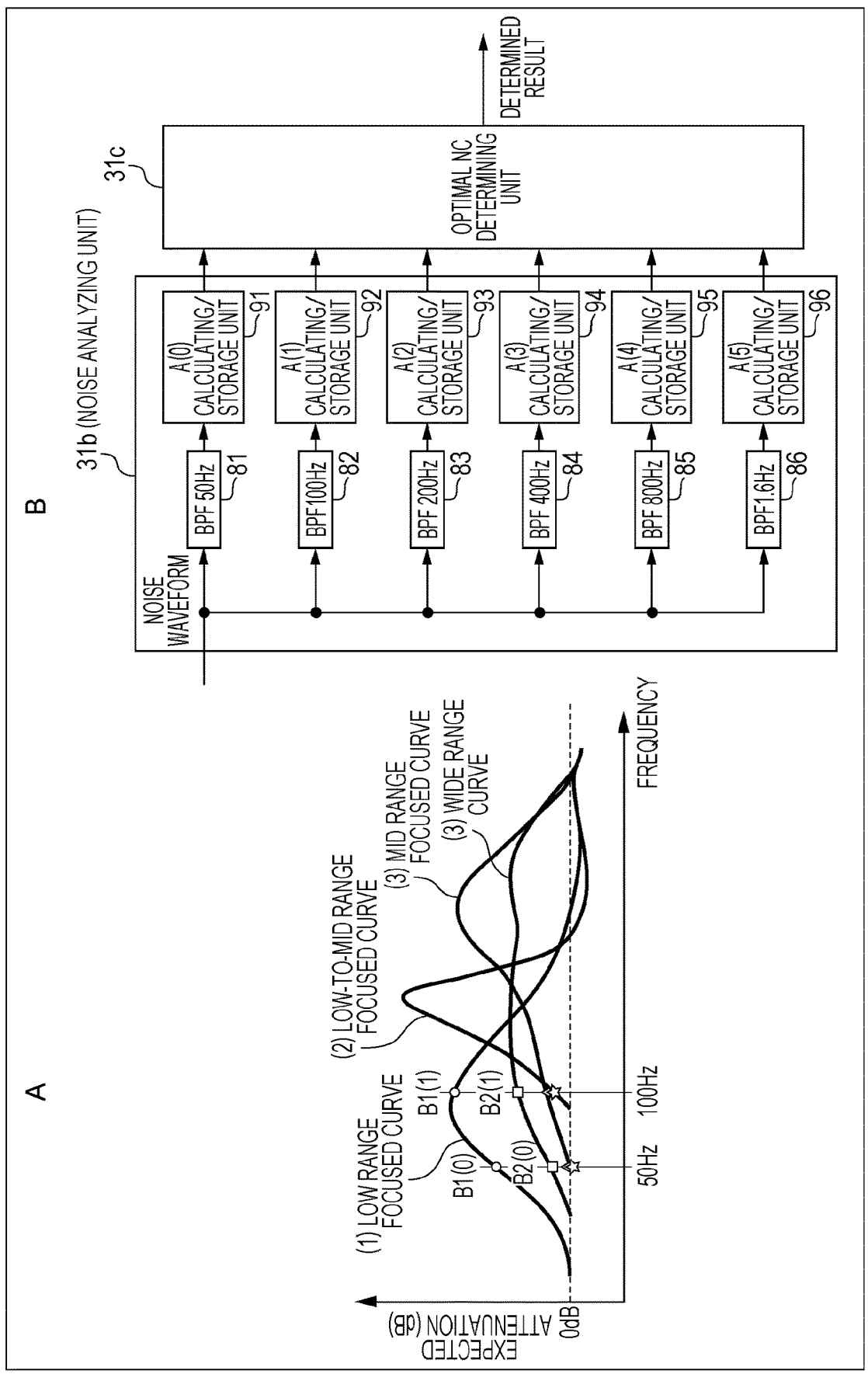
FIGS. 5A and 5B are illustrative diagrams of noise analysis and an optimal NC determining process of the embodiment.
Figure 6:
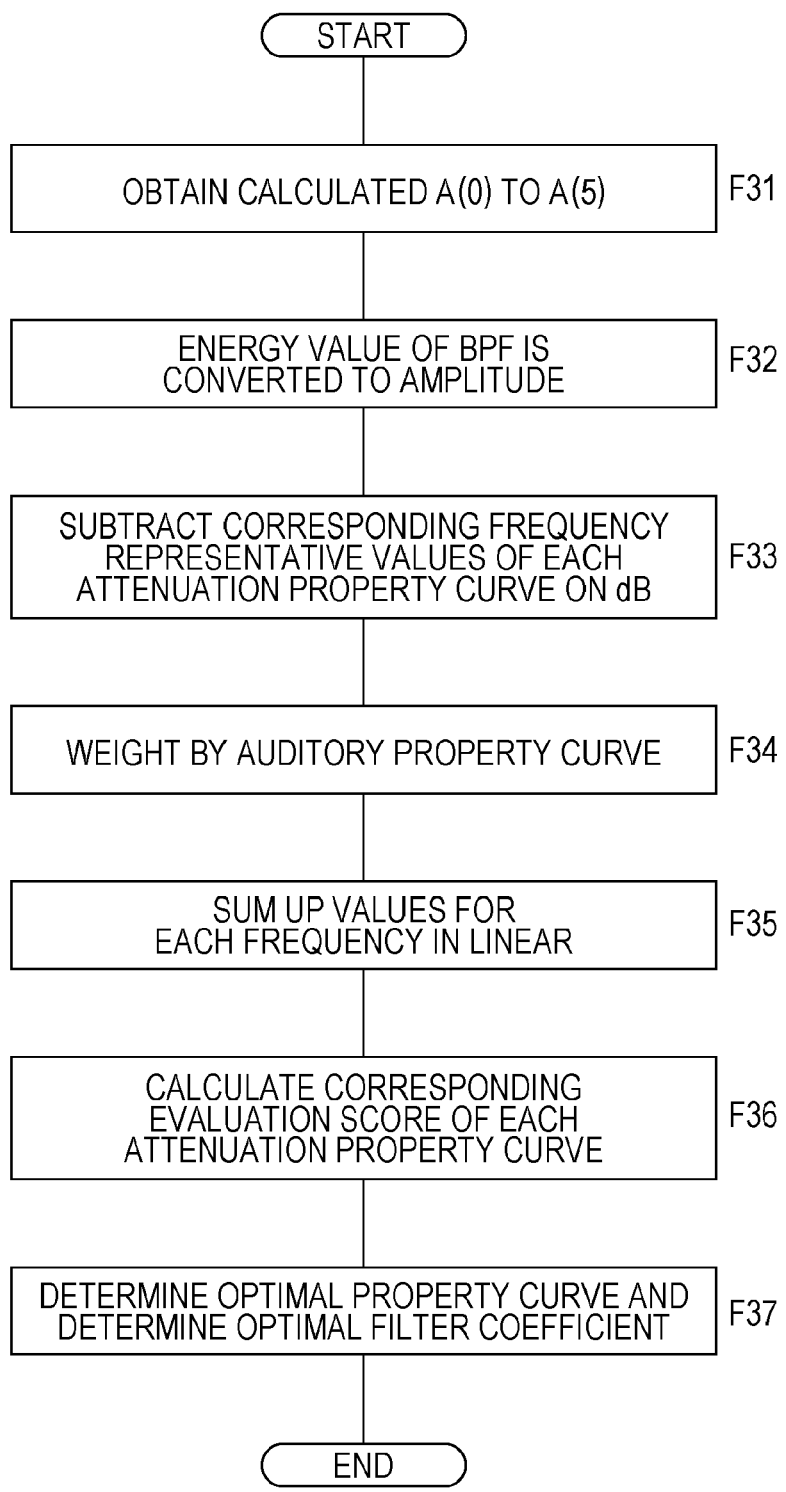
FIG. 6 is a flowchart of the noise analysis and the optimal NC determining process of the embodiment.

A specific process example at steps F102 and F103 is described with reference to FIGS. 5 and 6.

FIG. 5A illustrates a filter coefficient group for the FB-DNC filter 17FB stored in the memory unit 12 on the headphone device 1 side, for example, as curves (noise reducing curves) on a frequency axis.

For example, four types of filter coefficient sets are illustrated: (1) low range focused curve, (2) low-to-mid range focused curve, (3) mid range focused curve, and (4) wide range curve. The four curves correspond to four NC modes.

The headphone device 1 side selects the filter coefficient set corresponding to any curve according to the indication of the NC mode and sets the same for the FB-DNC filter 17FB.

Although not illustrated, the filter coefficient sets for the FF-DNC filter 17FF and the equalizer 19 are also stored according to the four modes, for example, and the controller 11 selects and sets according to the indication of the NC mode.

The controller 31 may notify the controller/arithmetic unit 31 of such information of the NC mode (filter coefficient set according to the NC mode) selectable on the headphone device 1 side when the communication is established at steps F101 and F200. Alternatively, the controller/arithmetic unit 31 may also grasp the NC mode (filter coefficient set) selectable by the headphone device 1 with which this communicates from the NC system database stored in the memory unit 32 by receiving the model name of the headphone device 1.

FIG. 5B illustrates a configuration example as the noise analyzing unit 31b and the optimal NC determining unit 31c in the controller/arithmetic unit 31.

The noise analyzing unit 31b includes six bandpass filters 81, 82, 83, 84, 85, and 86 and six energy value calculating/storage units 91, 92, 93, 94, 95, and 96 which calculate energy values of outputs of the six bandpass filters 81, 82, 83, 84, 85, and 86 as dB values to store in respective internal registers in this example.

In a case of this example, pass center frequencies of the six bandpass filters 81, 82, 83, 84, 85, and 86 are set to 50 Hz, 100 Hz, 200 Hz, 400 Hz, 800 Hz and 1.6 kHz, respectively.

A signal from the A/D converting circuit 35, that is, the audio signal of the ambient noise NZ obtained by the microphone 37 is input to the noise analyzing unit 31b. The audio signal (noise waveform) is input to each of the six bandpass filters 81, 82, 83, 84, 85, and 86. The outputs of the six bandpass filters 81, 82, 83, 84, 85, and 86 are supplied to the energy value calculating/storage units 91, 92, 93, 94, 95, and 96 and energy values A(0), A(1), A(2), A(3), A(4), and A(5) are calculated to be stored in the respective internal registers.

The optimal NC determining unit 31c grasps the four sets of filter coefficients corresponding to the four types of noise reducing curves (1), (2), (3), and (4) illustrated in FIG. 5A. For example, the controller/arithmetic unit 31 stores the four sets of filter coefficients in a work memory by being notified of the same from the headphone device 1 side or by reading the same from the NC system database as described above.

The optimal NC determining unit 31c stores attenuation representative values (dB values) at 50 Hz, 100 Hz, 200 Hz, 400 Hz, 800 Hz, and 1.6 kHz in each of the noise reducing curves (1), (2), (3), and (4) in the work memory so as to correspond to each filter coefficient.

For example, the attenuation representative values (dB values) at 50 Hz, 100 Hz, 200 Hz, 400 Hz, 800 Hz, and 1.6 kHz of the low range focused curve (1) are stored so as to be associated with the corresponding filter coefficient as B1(0), B1(1), B1(2), . . . , and B1(5), respectively, and the attenuation representative values (dB values) at 50 Hz, 100 Hz, 200 Hz, 400 Hz, 800 Hz, and 1.6 kHz in the low-to-mid range focused curve (2) are stored so as to be associated with the corresponding filter coefficient as B2(0), B2(1), B2(2), . . . , and B2(5), respectively.

Meanwhile, in FIG. 5A, B1(0), B1(1), B2(0), and B2(1) are illustrated.

The optimal NC determining unit 31c detects differences between the energy values A(0), A(1), A(2), A(3), A(4), and A(5) stored in the energy calculating/storage units 91 to 96 and the attenuation representative values by the noise reducing curve by each of the filter coefficients stored in the memory 24 and determines the filter coefficient corresponding to the noise reducing curve with the smallest total sum of the differences, as the optimal filter coefficient. Then, the NC mode corresponding to the optimal filter coefficient is made the optimal NC mode.

That is, the total sum of the differences between the energy values A(0), A(1), A(2), A(3), A(4), and A(5) and the attenuation representative values by the noise reducing curve by each of the filter coefficients equals to a remainder as a result of attenuation by each noise reducing curve for input noise and the smaller the total sum, the more the noise is reduced.

An example of a flow of processing operation of the noise analyzing unit 31b and the optimal NC determining unit 31c described above is illustrated in a flowchart in FIG. 6.

First, the energy values A(0), A(1), A(2), A(3), A(4), and A(5) of the outputs of the bandpass filters 81 to 86 of the noise analyzing unit 31b are calculated to be stored in the registers (step F31).

Next, the optimal NC determining unit 31c reads the stored energy values A(0) to A(5) and converts the energy to an amplitude to correct the values (step F32). This correction is required because, if overall selectivity Q of each of the bandpass filters 81 to 86 is constant, when white noise with a constant frequency amplitude value is allowed to pass, for example, the energy values of a passed waveform are not constant and the low range is output so as to be large. There also is a case in which the correction is required depending on a manner of setting the overall selectivity Q, so that they are collectively corrected.

Next, the optimal NC determining unit 31c subtracts the representative values B1(0) to B1(5) of the low range focused curve (1) from the corrected values of the energy values A(0) to A(5), respectively (step F33).

Next, the optimal NC determining unit 31c corrects the subtracted values by an auditory property curve to obtain values C1(0) to C1(5) (step F34).

Next, the optimal NC determining unit 31c calculates a total value of the values C1(0) to C1(5) in a linear value (step F35). The total value becomes an evaluation score for one noise reducing curve.

Herein, the auditory property curve may be a so-called A curve or C curve, a curve obtained by converting loudness by adding an absolute sound volume, or a uniquely set curve.

Then, the optimal NC determining unit 31c executes the operation at steps F33 to F35 described above for all the noise reducing curves (1) to (4) to obtain the evaluation score corresponding to each noise reducing curve (step F36).

When score values corresponding to all the curves are calculated, the optimal NC determining unit 31c determines that an attenuating curve with the smallest evaluation score value is expected to have the largest noise attenuating effect and determines the filter coefficient corresponding to the attenuating curve as the optimal filter coefficient set (step F37). According to this, one optimal NC mode is selected.

Meanwhile, the above-described process example is one example of determining the optimal NC mode. There may be another specific noise analyzing method and optimal filter coefficient determining method.

The optimal NC mode is determined by the above-described process, for example, at steps F102 and F103 in FIG. 4. When the optimal NC mode is determined, the controller/arithmetic unit 31 transmits the indication information indicating the optimal NC mode to the headphone device 1 side at step F104. That is, this generates the indication information indicating the optimal NC mode as communication data and allows the communicating unit 33 to transmit the same.

The controller 11 on the headphone device 1 side captures the indication information received by the communicating unit 13 at step F201.

Then, this performs a process to disconnect the communication between the controller/arithmetic unit 31 and the controller 11 through the communicating units 33 and 13 at steps F105 and F202.

On the headphone device 1 side, the controller 11 reads the filter coefficient from the memory unit 12 based on the NC mode indicated in the indication information at step F203.

Then, the controller 11 sets the read filter coefficient for each filter in the DSP 27 at step F204.

A specific example of the above-described process is as follows. For example, suppose that the user takes a subway. In this case, the filter coefficient set of the subway mode is determined to be the optimal filter coefficient by the noise analyzing process and the optimal NC determining process on the portable terminal 2 side and the "subway mode" is indicated to the headphone device 1 side as the indication information.

In this manner, when the subway mode is indicated as the NC mode by the indication information, the controller 11 on the headphone device 1 side reads the coefficient set for the FF-DNC filter 17FF, the coefficient set for the FB-DNC filter 17FB, and the coefficient set for the equalizer 9 as the filter coefficient of the subway mode from the memory unit 12 and sets them for the FF-DNC filter 17FF, the FB-DNC filter 17FB, and the equalizer 19, respectively.

According to this, each filter in the DPS 27 executes a filtering process of the subway mode. As a result, it is automatically switched to optimal NC system setting according to a situation in the subway for a headphone user (listener), so that it is possible to listen to the music and the like in a state with a high noise canceling effect.

As is understood from the description above, this embodiment performs the noise analyzing process and optimal NC method/parameter calculation by using the microphone 37 and the DSP or the CPU (controller/arithmetic unit 31) of the portable terminal 2 on the assumption that the user possesses the portable terminal 2 (for example, a smartphone) with the microphone 37 capable of wirelessly communicating with the headphone device 1. The headphone device 1 side is notified of a result and the NC system is allowed to operate in the optimal NC mode on the headphone device 1 side.

In this case, by allowing the portable terminal 2 side having relatively high processing capability to execute the process requiring a large resource burden such as the noise analysis and the optimal NC mode determination, a process burden on the headphone device 1 side is significantly reduced and a noise reducing process is automatically realized in the optimal NC mode according to an ambient environment noise condition. Further, it is not necessary to analyze the noise and determine the optimal NC mode on the headphone device 1 side, so that the power consumption of the headphone device 1 may be reduced and eventually operating time may be elongated.

Meanwhile, it is normally supposed that the user wears the headphone device 1 and carries the portable terminal 2 with him/her in a pants pocket, a shirt pocket or in a bag and the like, for example.

A low range component is dominant in terms of a frequency property in the noise in a normal natural environment and this is less susceptible to a property effect by sound isolation when the portable terminal 2 is put into the pocket and the like, so that it is possible for the NC system of the headphone device 1 to determine a substantially appropriate optimal NC mode even when the noise is picked up on the portable terminal 2 side.

Although there is a case in which a property of the microphone 37 significantly differs from one portable terminal 2 to another, if an application (NC process optimization program) to pick up/measure/analyze on the portable terminal 2 holds a property of each model on the database (or download the same from the network to update), for example, it is also possible to analyze after correcting the property by using the information.

Although the portable terminal 2 side only notifies the headphone device 1 of the optimal NC mode when this determines the same in the above-described example, if a noise measurement result, the analysis result and the like are displayed on a screen for making use of a function of the portable terminal 2, convenience for the user is further improved.

The portable terminal 2 may realize various functions by installing the application program as a so-called information processing device. In a case of this example, the portable terminal 2 may realize the same by installing the NC process optimization program which performs the above-described process, for example. That is, when the NC process optimization program is installed on the portable terminal normally used by the user, the portable terminal 2 of this embodiment is realized, so that the headphone system of this example may be easily provided to the user.

Especially, in the portable terminal 2 such as the portable phone, the smartphone, and a PDA, the microphone is necessarily embedded as far as this has a call function. Therefore, to pick up the noise by using the microphone as the microphone 37 in FIG. 3 does not increase a device burden of the portable terminal 2. Similarly, a recent portable terminal 2 is often provided with a Bluetooth communication function and the like, so that this often has a configuration as the communicating unit 33. In this point also, the portable terminal 2 of this example may be realized by using the portable phone, the smartphone and the like possessed by the user.

That is, in most cases, the portable terminal 2 of this example may be realized by installing the NC process optimization program on the portable phone and the like which the user already possesses.

For example, if one user possesses a plurality of headphone devices 1, it is conventionally necessary that each headphone device 1 has a noise analyzing function and an optimal NC mode determining function embedded therein; however, in this embodiment, one portable terminal 2 may be provided with a processor for analyzing the noise and determining the optimal NC mode and a plurality of headphone devices 1 may share the same. This is advantageous for a common UI and in space. Actually, when the user uses a plurality of headphone devices 1 one at a time, the headphone system of this example may be realized by a set of each headphone device 1 and one portable terminal 2, so that a different portable terminal 2 is not necessary for the headphone device 1 to be used.

Meanwhile, various activation triggers of the process on the portable terminal 2 side at step F100 in FIG. 4 may be considered.

When the NC process optimization program is periodically activated, the controller/arithmetic unit 31 measures time from previous execution by an inner timer and may make an elapse of predetermined time the activation trigger. For example, the process in FIG. 4 is executed at predetermined time; every few seconds, every several tens of seconds, every one to few minutes, every 10 to 30 minutes or the like.

It is possible that the portable terminal 2 side always detects a condition of a sound from outside, and when this detects variation in an external noise condition, this may consider that the activation trigger is created. For example, when change in average value per unit time of a noise level, significant change in frequency property and the like is detected, the process in FIG. 4 is performed considering that the activation trigger is created. Alternatively, it is also possible to always execute the process of the noise analyzing unit 31b, and when it is determined that the ambient noise condition is changed, it may be considered that the activation trigger is created.

Further, it is also possible that the portable terminal 2 is provided with a position sensor, a temperature sensor, an atmospheric pressure sensor, an altitude sensor, a motion speed sensor and the like and it is determined that the activation trigger is created according to detected information thereof.

When the above-described trigger detection is performed, the NC system is preferably automatically optimized without any operation by the user.

It is also possible to determine the activation trigger as the user operation. When the user performs selecting/activating operation of the NC process optimization program by operating the operating unit 34 of the portable terminal 2 as the user operation, the process in FIG. 4 is performed supposing that the activation trigger is created.

Meanwhile, as a modification, it is also possible that the operating unit is provided on the headphone device 1 side, and when the operating unit is operated, the controller 11 of the headphone device 1 transmits activation trigger information from the communicating unit 13 to the portable terminal 2 and the controller/arithmetic unit 31 which receives the same recognizes that the activation trigger is created.

According to the user operation, the user may reset when he/she does not feel that the NC mode is optimal.

It is also possible that the activation trigger is not especially sequentially determined and the NC process optimization program is always executed.

For example, it is configured that the noise analyzing process and the optimal NC mode determining process described at steps F102 and F103 are always executed on the portable terminal 2 side. This is an example in which, when a determination result of the optimal NC mode is changed, a process to establish the communication with the headphone device 1 is performed and the indication information is transmitted to the headphone device 1.

As described above, in the headphone device 1, it is configured that the filter coefficient of not only the FF-DNC filter 17FF and the FB-DNC filter 17FB but also the equalizer 19 is set according to the NC mode.

In a case of a feedback type noise reducing device, when the filter coefficient of the digital filter is changed and the noise reducing curve is changed, an externally input audio signal S being a listening target is subjected to an effect corresponding to a frequency curve of a noise reducing effect, so that an equalizer property should be changed according to the change in filter coefficient of the digital filter.

Then, it is appropriate to store the parameters (filter coefficients) for changing the equalizer property of the equalizer 19 so as to correspond to each of a plurality of filter coefficients of the digital filter in the memory unit 12, for example, and change the equalizer property according to the NC mode.

Meanwhile, although the headphone device 1 in FIG. 2 is equipped with the combined type NC system in the example, it goes without saying that an example in which this is equipped with a feedback type NC system and a feedforward type NC system may also be considered.

Figure 7:
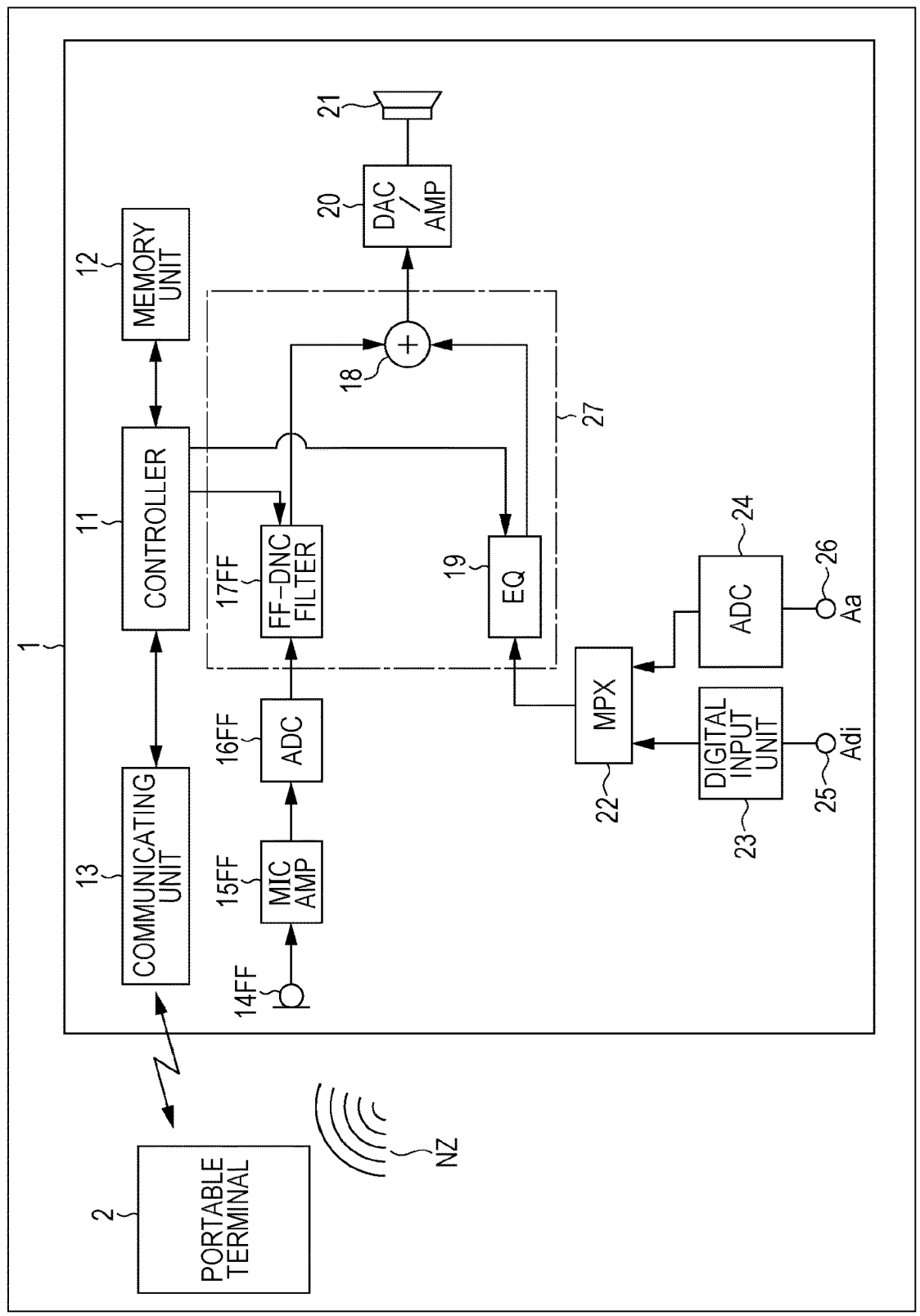
FIG. 7 is a block diagram of the headphone device of a modification of the first embodiment.

FIG. 7 is a block diagram of the configuration of the headphone device 1 equipped with the feedforward type NC system.

Figure 8:
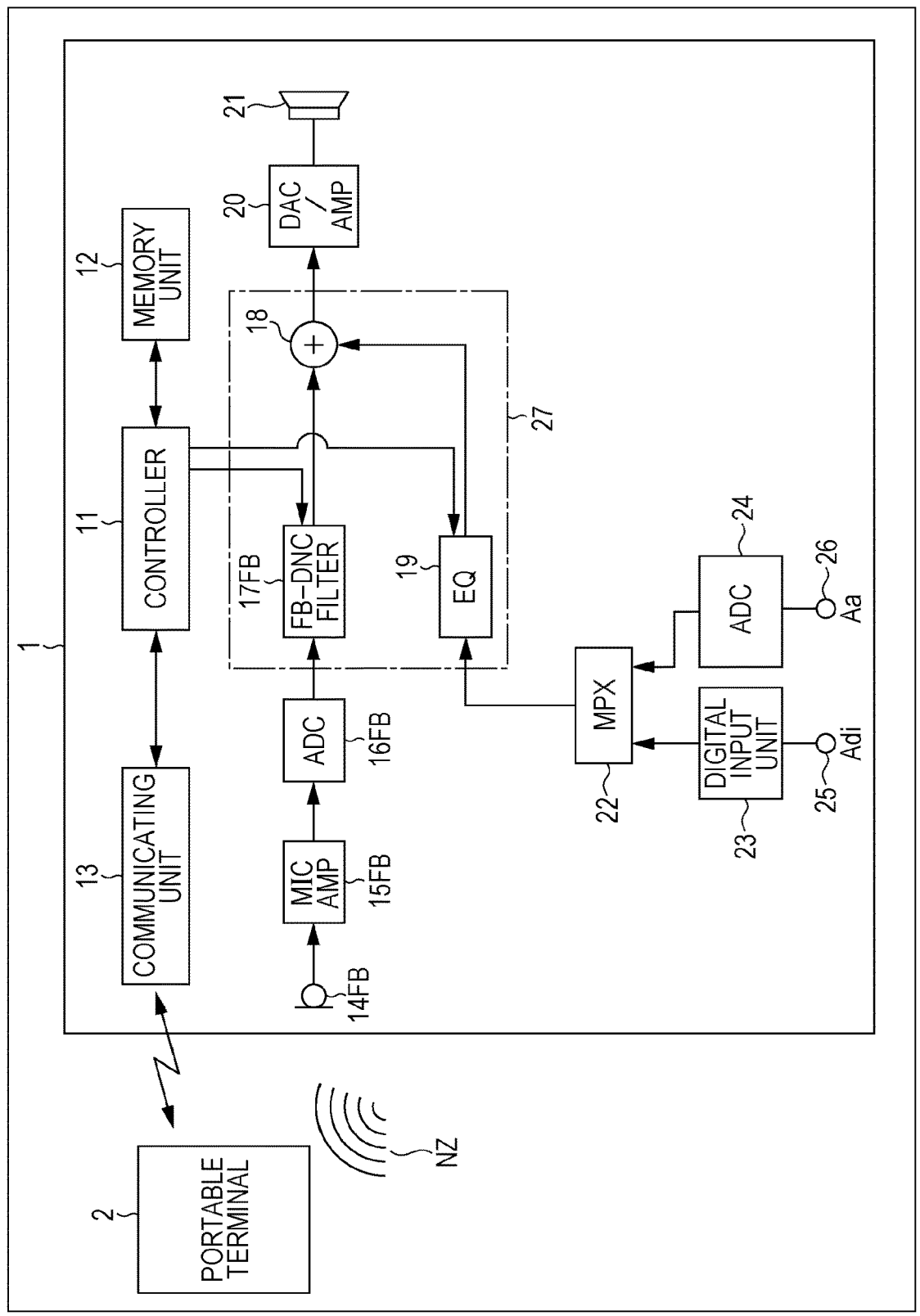
FIG. 8 is a block diagram of the headphone device of the modification of the first embodiment.

FIG. 8 is a block diagram of the configuration of the headphone device 1 equipped with the feedback type NC system.

In FIGS. 7 and 8, the same reference sign is assigned to the same portion as that in FIG. 2 and the description thereof is not repeated.

As illustrated, FIG. 7 illustrates a configuration example in which the noise canceling signal is generated by a feedforward system circuit formed of the microphone 14FF, the microphone amplifier 15FF, the A/D converter 16FF, and the FF-DNC filter 17FF to be synthesized with the input audio signal by the adder 18. This may obtain a noise canceling effect similar to that of the configuration in FIG. 19.

FIG. 8 illustrates a configuration example in which the noise canceling signal is generated by a feedback system circuit formed of the microphone 14FB, the microphone amplifier 15FB, the A/D converter 16FB, and the FB-DNC filter 17FB to be synthesized with the input audio signal by the adder 18. The noise canceling effect similar to that of the configuration in FIG. 21 may be obtained.

In both cases in FIGS. 7 and 8, it is configured that the controller 11 sets the filter coefficient for generating the noise canceling signal and the filter coefficient of the equalizer 19 according to the NC mode indicated by the indication information from the portable terminal 2. According to this, an effect of reducing the process burden and reducing the power consumption of the headphone device 1 may be obtained.

Meanwhile, to change the filter coefficient of the equalizer 19 according to the NC mode as described above is important in a case of the feedback type in FIG. 8. On the other hand, in a case of the feedforward type in FIG. 7, the need to change the parameter of the equalizer 19 according to the NC mode is not significant directly, it is useful to adjust the equalizer property according to the NC mode in terms of positive sound quality setting according to the NC mode and the like, for example. It goes without saying that the property of the equalizer 19 may be fixed in the case of the feedforward type.

Although the configuration example of the headphone device 1 equipped with the feedforward type or feedback type NC system illustrated in FIGS. 7 and 8 described above is similarly supposed in a case of second to fifth embodiments to be described later although this is not repeatedly illustrated or described.

<4. Second Embodiment (Noise Analysis)>

A second embodiment is described with reference to FIG. 9. Meanwhile, configurations of a headphone device 1 and a portable terminal 2 are similar to those in FIGS. 2 and 3.

In a case of the second embodiment, however, it is not necessary to store a filter coefficient set according to an NC mode in a memory unit 12 in the headphone device 1.

On the other hand, the filter coefficient sets for various NC modes according to various headphone devices 1 are stored in a memory unit 32 on the portable terminal 2 side. For example, they may be held as the above-described NC system database.

Figure 9:
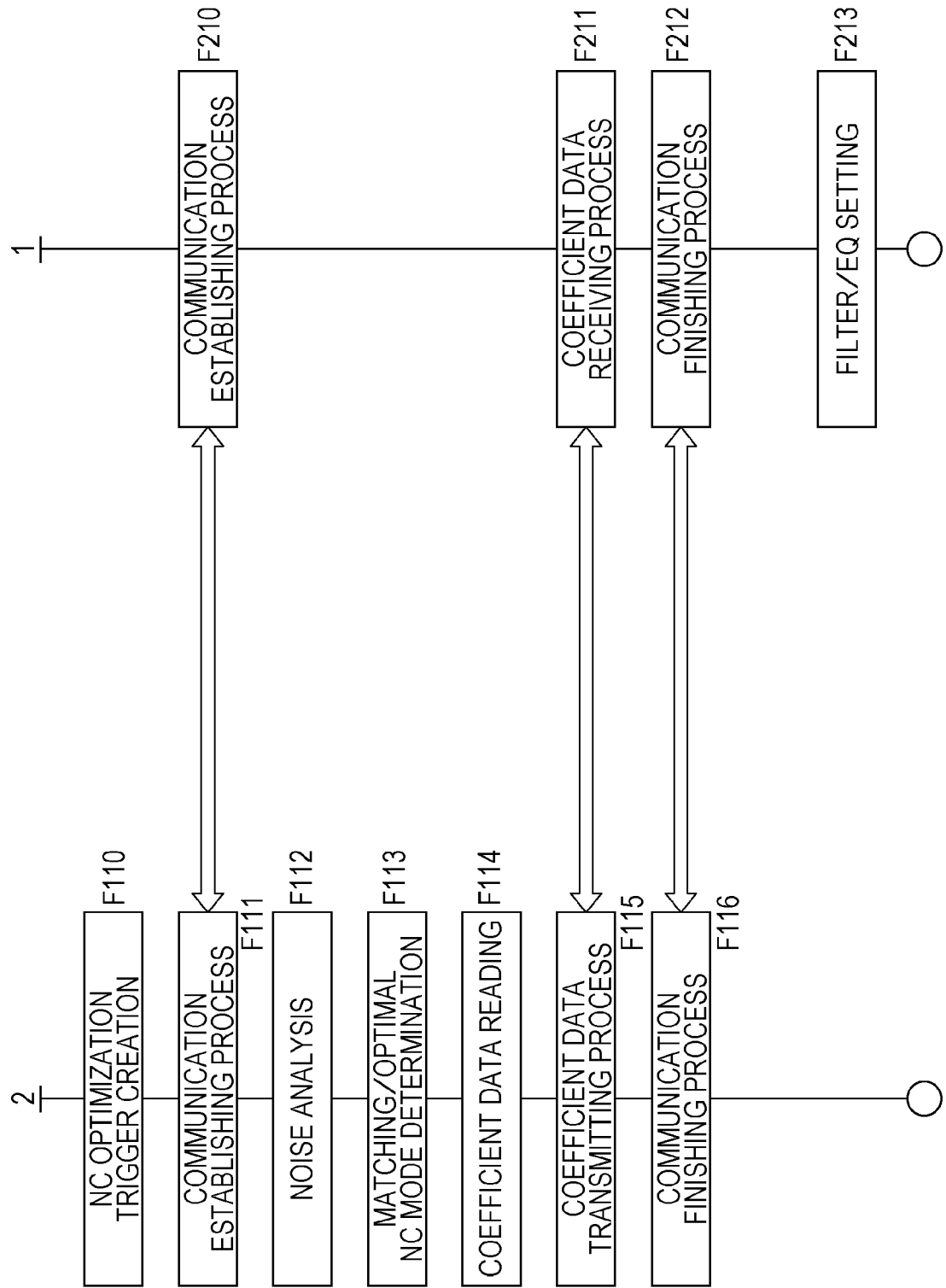
FIG. 9 is a flowchart of a parameter setting process of a second embodiment.

A process example of a controller/arithmetic unit 31 and a controller 11 is illustrated in FIG. 9.

When the controller/arithmetic unit 31 determines that an activation trigger of an NC process optimization program is created at step F110, this performs a communication establishing process at step F111. In response to this, the controller 11 of the headphone device 1 also performs the communication establishing process at step F210. When communication is established, necessary information is transmitted. For example, the controller 11 notifies the portable terminal 2 of a model name of the headphone device 1 of the same, an NC system type and the like.

The controller/arithmetic unit 31 of the portable terminal 2 performs a noise analyzing process at step F112 and determines an optimal NC mode at step F113. This is, for example, the process described in the first embodiment.

In this case, the filter coefficient set related to the determined optimal NC mode is read from the memory unit 32 at step F114 and transmission data including the filter coefficient set is generated. For example, in a case of a configuration in which the headphone device 1 includes a combined type NC system in FIG. 2, indication information including the filter coefficient set for a FF-DNC filter 17FF, the filter coefficient set for a FB-DNC filter 17FB, and the filter coefficient set for an equalizer 19 is generated as the transmission data.

The controller/arithmetic unit 31 allows a communicating unit 33 to transmit the transmission data (indication information) at step F115.

The controller 11 of the headphone device 1 captures the indication information including the filter coefficient set itself received by a communicating unit 13 at step F211.

At steps F116 and F212, a process to disconnect the communication between the controller/arithmetic unit 31 and the controller 11 through the communicating units 33 and 13 is performed.

Then, on the headphone device 1 side, the controller 11 sets the filter coefficient included in the indication information for each filter of a DSP 27 at step F213.

A specific example of the above-described process is as follows. For example, suppose that the user takes a subway. In this case, the filter coefficient set of a subway mode is determined to be an optimal filter coefficient by the noise analyzing process and the optimal NC determining process on the portable terminal 2 side and an actual filter coefficient is included in the indication information to be transmitted to the headphone device 1 side.

The controller 11 on the headphone device 1 side which receives the indication information captures the coefficient set for the FF-DNC filter 17FF, the coefficient set for the FB-DNC filter 17FB, and the coefficient set for the equalizer 19 included in the indication information and sets them for the FF-DNC filter 17FF, the FB-DNC filter 17FB, and the equalizer 19, respectively.

According to this, each filter in the DPS 27 executes a filtering process of the subway mode. As a result, it is automatically switched to optimal NC system setting according to a situation in the subway for a headphone user (listener), so that it is possible to listen to the music and the like in a state with a high noise canceling effect.

In this case, as in the first embodiment, an effect of reducing a resource burden and power consumption of the headphone device 1 is obtained.

Especially, in this second embodiment, it is not necessary that the headphone device 1 side store the filter coefficient set, so that a memory resource may be saved.

The NC modes are not especially limited and the filter coefficient of the NC system may be variously controlled by the portable terminal 2 side, so that various NC modes in the headphone device 1 may be flexibly realized according to an application program of the portable terminal 2. For example, it is possible that the portable terminal 2 side downloads a new filter coefficient set and sets the new filter coefficient set for the headphone device 1, and as a result, performance of the headphone device 1 may be improved and diversified.

<5. Third Embodiment (Stream Transmission)>

A third embodiment is described with reference to FIGS. 10 and 11. This is an example in which stream data such as music, that is, an audio signal to be listened to by a user with a headphone device 1 is transmitted from a portable terminal 2 to the headphone device 1.

Figure 10:
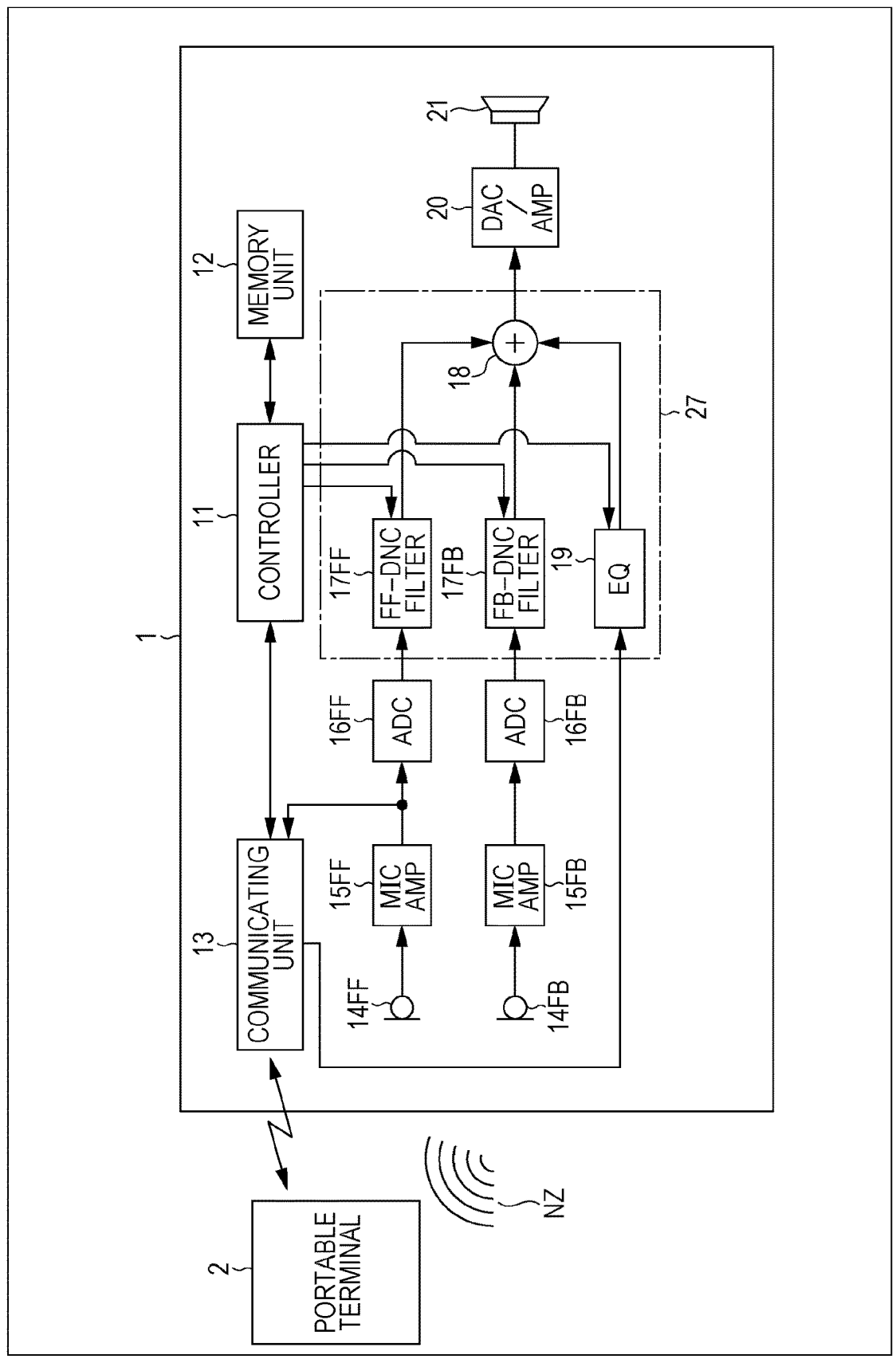
FIG. 10 is a block diagram of a headphone device of a third embodiment.

FIG. 10 illustrates a configuration example of the headphone device 1. Meanwhile, the same reference sign is assigned to the same portion as that in FIG. 2 and the description thereof is omitted.

In a case in FIG. 10, as is understood as compared to FIG. 2, an input channel of an input audio signal (terminals 25 and 26, a digital input unit 23, an A/D converter 24, and a multiplexer 22 in FIG. 2) is not provided.

A communicating unit 13 receives not only indication information but also stream audio data. The stream audio data transmitted from the portable terminal 2 is received by the communicating unit 13 to be supplied to an equalizer 19 as the input audio signal.

Other configurations are similar to those in FIG. 2.

Figure 11:
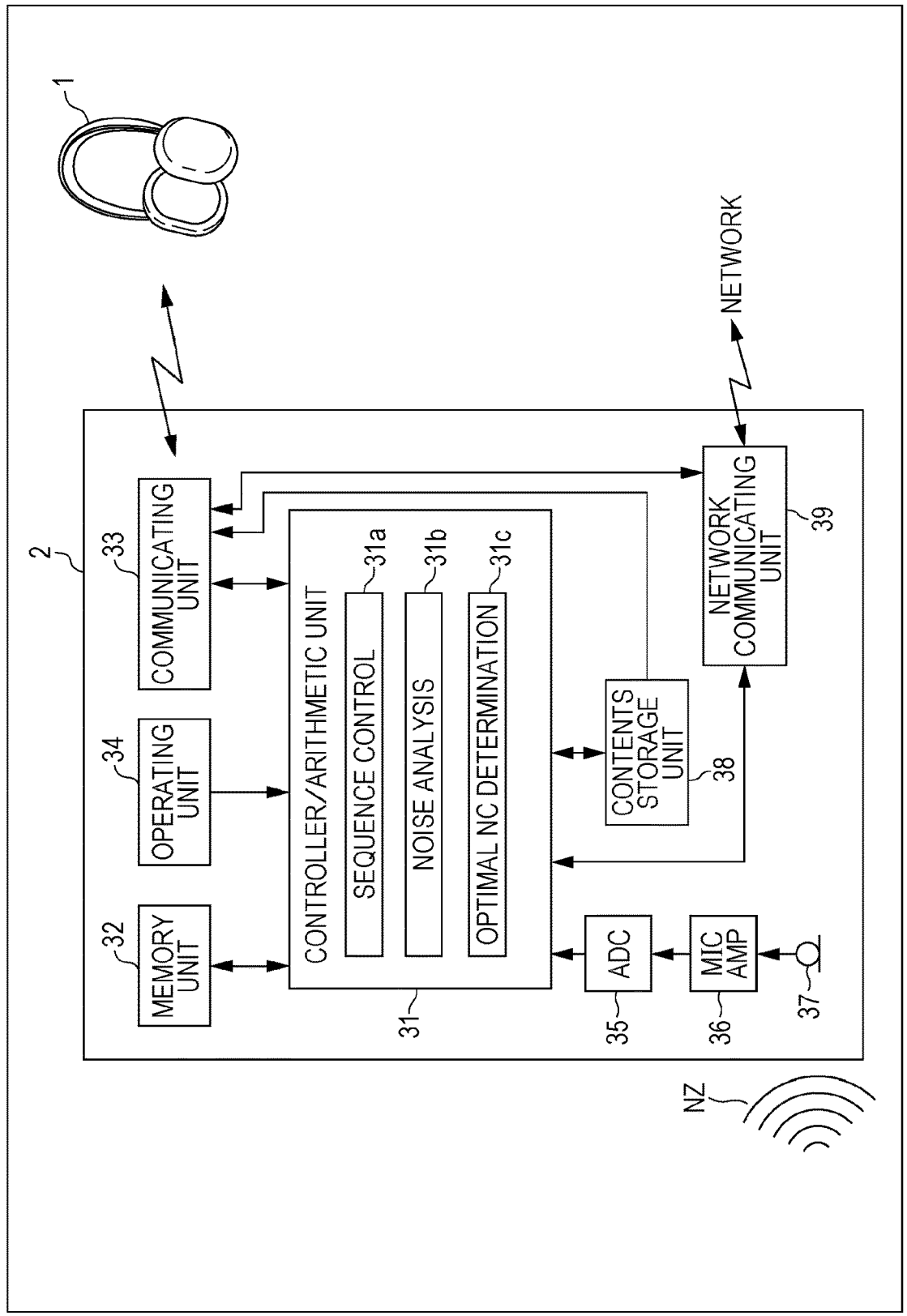
FIG. 11 is a block diagram of a portable terminal of the third embodiment.

FIG. 11 illustrates a configuration of the portable terminal 2. The same reference sign is assigned to the same portion as that in FIG. 3 and the description thereof is omitted.

In this case, as is understood as compared to FIG. 3, contents storage unit 38 is provided. For example, this is formed of a HDD, a memory card, an optical disk and the like. The stream data as music contents is stored in the contents storage unit 38, for example.

A controller/arithmetic unit 31 performs control to select the music contents from the contents storage unit 38 to read according to user operation from an operating unit 34, for example, and transmit the stream data from the communicating unit 33 to the headphone device 1.

In this case, a process regarding an NC system is performed in the same manner as that in the first or second embodiment described above. That is, in the portable terminal 2, noise analysis and optimal NC mode determination (optimal filter coefficient determination) are performed by activation of an NC process optimization program is activated, and indication information is transmitted to the headphone device 1. A controller 11 of the headphone device 1 sets filter coefficients of a FF-DNC filter 17FF, a FB-DNC filter 17FB, and the equalizer 19 according to the indication information.

According to such a configuration of the third embodiment, the portable terminal 2 also serves as a music source (input audio signal source) of the headphone device 1.

That is, the user allows the portable terminal 2 to operate as an audio player. Then, reproduced music is transmitted to the headphone device 1 as the stream audio data and acoustically reproduced by a driver unit 21 through the equalizer 19, an adder 18, and a DAC/amplifier unit 20, so that the user may listen to this.

It is not necessary that the user carry the audio player and the like in addition to the portable terminal 2.

Meanwhile, it is also possible to transmit the stream audio data not obtained from the contents storage unit 38 but received by a network communicating unit 39 from the communicating unit 33 to the headphone device 1. For example, it is also possible to receive transmission of the music and the like from a predetermined server or to receive the music data and the like put on a so-called cloud by the portable terminal 2 and transmit the same to the headphone device 1 for the listener to listen.

In FIG. 10, it is illustrated such that an output of a microphone amplifier 15FF may be supplied to the communicating unit 13. This is an example in which a microphone 14FF is used as a transmitter microphone, for example.

For example, when the portable terminal 2 is in a calling state, voice of the user is picked up by the microphone 14FF and transmitted from the communicating unit 13 to the portable terminal 2 as stream data. The portable terminal 2 transmits by telephone the audio signal received by the communicating unit 33 as transmitted voice.

<6. Fourth Embodiment (Position Detection)>

Subsequently, a fourth embodiment as an example to indicate an NC mode based on current position detection is described.

Figure 12:
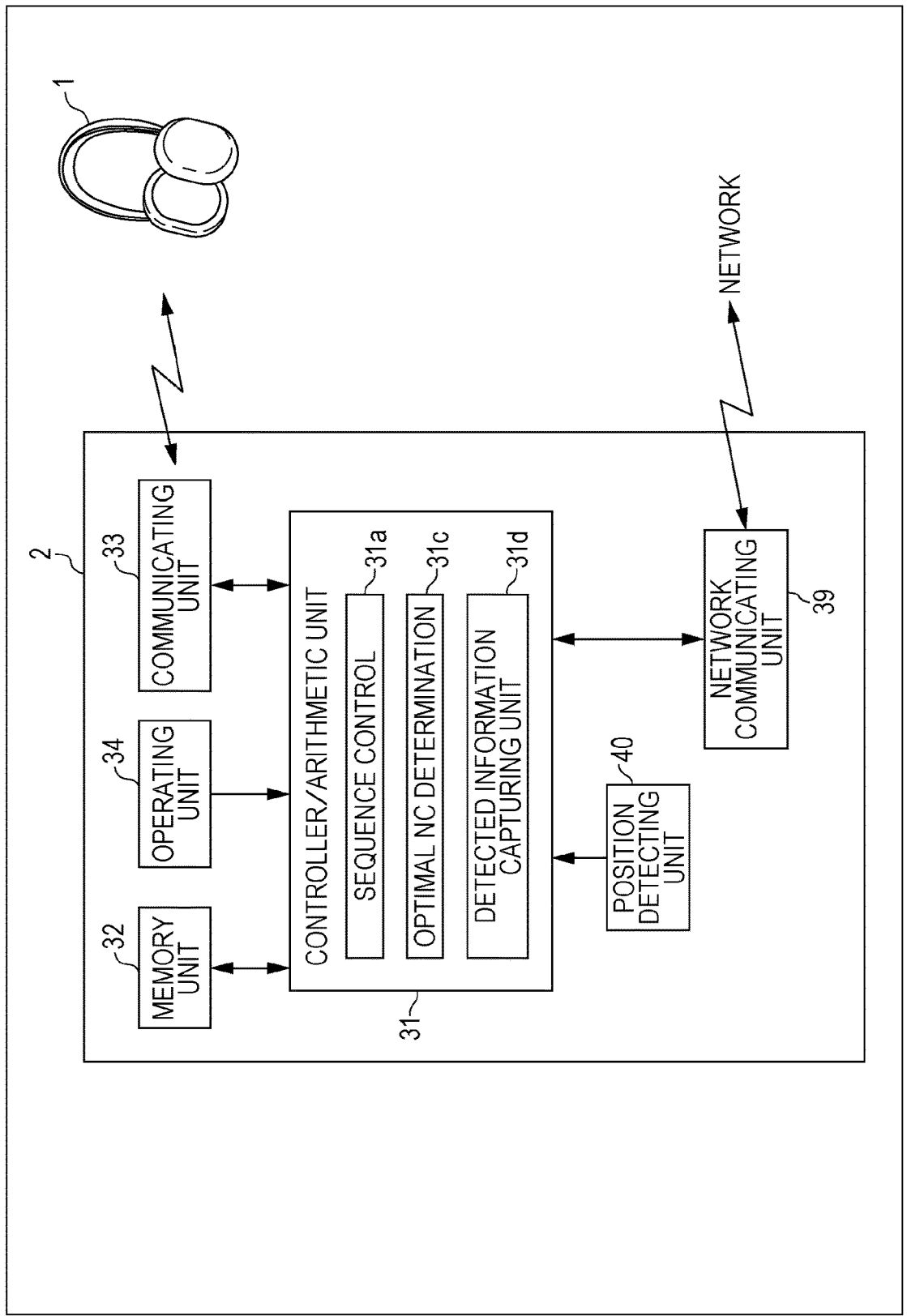
FIG. 12 is a block diagram of a portable terminal of a fourth embodiment.

FIG. 12 illustrates a configuration example of a portable terminal 2 in the fourth embodiment. Meanwhile, a headphone device 1 is configured in the same manner as that in FIG. 2.

In FIG. 12, the same reference signal is assigned to the same portion as that in FIG. 3. However, a controller/arithmetic unit 31 is not provided with a noise analyzing unit 31*b* but provided with a detected information capturing unit 31*d* is provided. That is, a function of the detected information capturing unit 31*d* is executed by the controller/arithmetic unit 31 by an NC process optimization program.

A position detecting unit 40 is also provided.

The position detecting unit 40 is a GPS (global positioning system) receiver, for example, which may detect current position information (latitude and longitude) and current speed information.

The detected information capturing unit 31*d* in the controller/arithmetic unit 31 performs a process to capture the current position information detected by the position detecting unit 40 at a necessary timing defined by a sequence controller 31*a*.

In a memory unit 32, application software such as the NC process optimization program and an NC system database are stored as in the first to third embodiments. In addition, in a case of the fourth embodiment, a map database is stored in the memory unit 32. The controller/arithmetic unit 31 may obtain information regarding an ambient environment such as a place name, an address, a street number, a facility, and transportation of an actual current position corresponding to the current position information (latitude and longitude) detected by the position detecting unit 40 by referring to the map database.

Meanwhile, for example, the map database may be downloaded from a server on a network by a network communicating unit 39 or, if the portable terminal 2 is provided with a reproducing unit of a portable medium such as a memory card and an optical disk, this may be read from the portable medium to be stored in the memory unit 32.

A process for NC process optimization by the headphone device 1 and the portable terminal 2 in the fourth embodiment is described with reference to FIG. 13.

Figure 13:
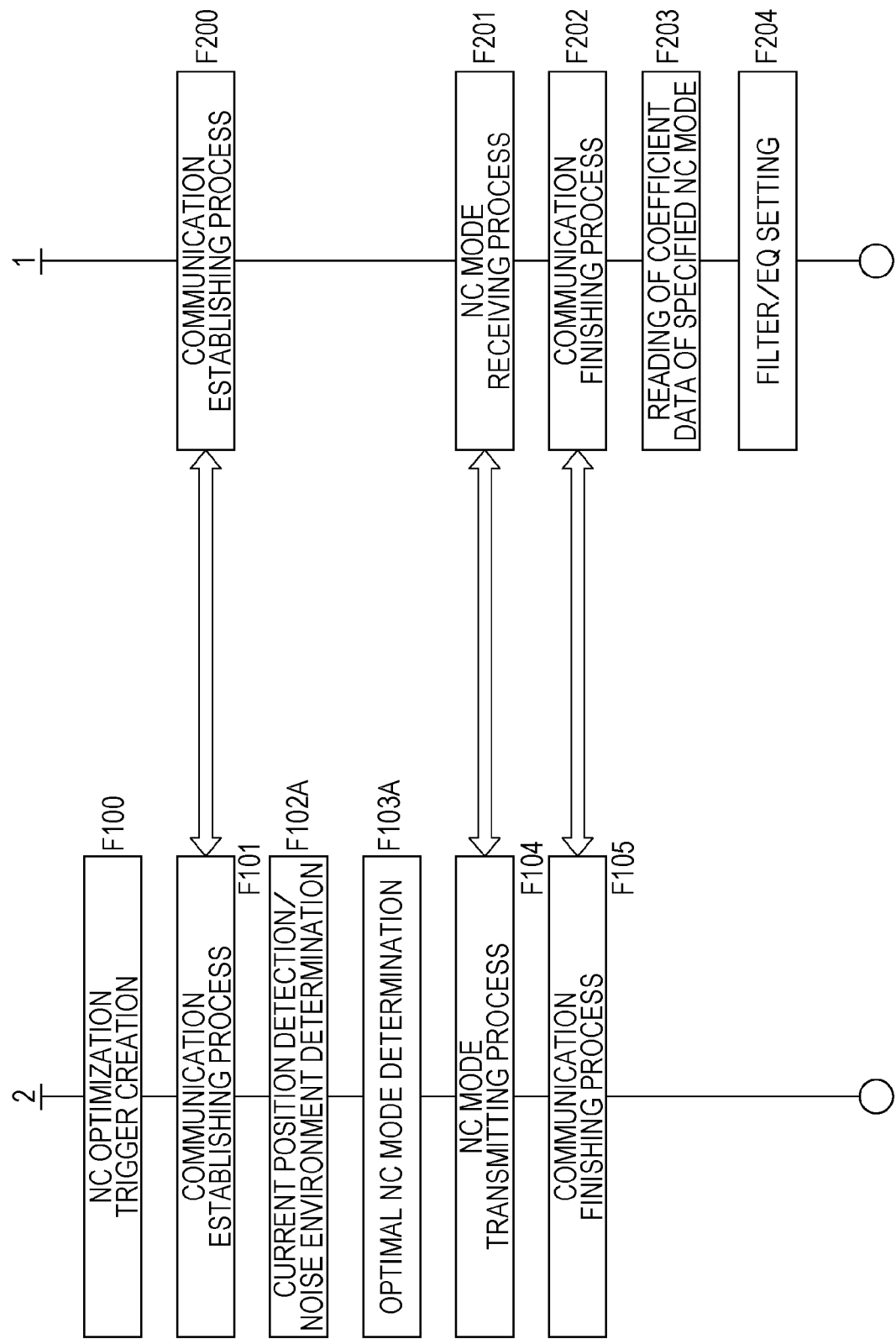
FIG. 13 is a flowchart of a parameter setting process of the fourth embodiment.

FIG. 13 illustrates a process executed by the NC process optimization program by the controller/arithmetic unit 31 by the portable terminal 2 and a process of a controller 11 of the headphone device 1 performed in response to the same.

When the controller/arithmetic unit 31 detects creation of a process execution trigger of the NC process optimization program at step F100, this performs processes after step F101 according to control of the sequence controller 31*a* (NC process optimization program).

First, the controller/arithmetic unit 31 performs a process to establish communication with the headphone device 1 by the communicating unit 33 at step F101. The controller 11 of the headphone device 1 performs the communication establishing process at step F200 in response to this. The process is similar to that described with reference to FIG. 4 so far.

Subsequently, the controller/arithmetic unit 31 of the portable terminal 2 captures the current position information (latitude and longitude) from the position detecting unit 40 by the function as the detected information capturing unit 31*d* at step F102A and determines an ambient noise environment of the current position with reference to the map database.

For example, the ambient noise environment of the current position of the user is determined such as an urban area, in a train, in a subway, in a vehicle (bus), and in an airplane.

Meanwhile, there is a case in which it is difficult to determine the ambient noise environment only by the position information. For example, even when it is found that the user is on a certain road with reference to the map database from the current position information, it is difficult to determine whether the user takes the bus and the like or the user walks. Therefore, in a case of the GPS receiver, the speed information may be obtained together with the position information. Therefore, it is also possible to determine the noise environment more correctly by using the position information and the speed information together.

When the noise environment is determined, the controller/arithmetic unit 31 determines an optimal NC mode according to the noise environment by a function of an optimal NC determining unit 31*c* at step F103A. For example, when the noise environment is determined to be in the subway, a subway mode is set. Meanwhile, when there is no NC mode directly corresponding to the determined noise environment, the NC mode which is relatively appropriate for the current noise environment may be selected. For example, if a train mode, an airplane mode, and an urban area mode are provided, when it is determined to be in the vehicle such as the bus, the "train mode" is selected.

When the optimal NC mode is determined, the controller/arithmetic unit 31 transmits the indication information indicating the optimal NC mode to the headphone device 1 side at step F104. That is, this generates the indication information indicating the optimal NC mode as communication data and allows the communicating unit 33 to transmit the same.

The controller 11 on the headphone device 1 side captures the indication information received by the communicating unit 13 at step F201.

Then, this performs a process to disconnect the communication between the controller/arithmetic unit 31 and the controller 11 through the communicating units 33 and 13 at steps F105 and F202.

On the headphone device 1 side, the controller 11 reads the filter coefficient from the memory unit 12 based on the NC mode indicated in the indication information at step F203.

Then, the controller 11 sets the read filter coefficient for each filter in the DSP 27 at step F204.

A specific example of the above-described process is as follows. For example, suppose that the user takes a subway. In this case, it is determined to be in the subway by the position detection and noise environment determination on the portable terminal 2 side and the "subway mode" is indicated to the headphone device 1 side as the indication information as the optimal mode.

According to the indication information, the controller 11 on the headphone device 1 side reads a coefficient set for a FF-DNC filter 17FF, the coefficient set for a FB-DNC filter 17FB, and the coefficient set for an equalizer 19 as the filter coefficients of the subway mode from a memory unit 12 and sets them for the FF-DNC filter 17FF, the FB-DNC filter 17FB, and the equalizer 19, respectively.

According to this, each filter in the DPS 27 executes a filtering process of the subway mode. As a result, it is automatically switched to optimal NC system setting according to a situation in the subway for a headphone user (listener), so that it is possible to listen to the music and the like in a state with a high noise canceling effect.

Meanwhile, in operation of the fourth embodiment, it is also possible to transmit not the indication information indicating the NC mode but the indication information directly specifying the filter coefficient from the portable terminal 2 to the headphone device 1 by applying a concept of the above-described second embodiment.

For example, when the user takes the subway, it is determined to be in the subway by the position detection and the noise environment determination on the portable terminal 2 side and the subway mode is considered to be the optimal. In this case, the filter coefficient set of the subway mode is included in the indication information to be transmitted to the headphone device 1 side.

The controller 11 on the headphone device 1 side which receives the indication information captures the coefficient set for the FF-DNC filter 17FF, the coefficient set for the FB-DNC filter 17FB, and the coefficient set for the equalizer 19 included in the indication information and sets them for the FF-DNC filter 17FF, the FB-DNC filter 17FB, and the equalizer 19, respectively.

In this manner also, a similar high-performance noise canceling effect may be obtained.

A configuration example to transmit stream data of music and the like from the portable terminal 2 to the headphone device 1 is also possible by applying a concept of the third embodiment.

According to the above-described fourth embodiment, as in the first to third embodiments, it goes without saying that the above-described various effects such as reduction in processing resource burden and reduction in power consumption of the headphone device 1 may be obtained.

In addition, a following effect may be obtained.

For example, in a case of a type to analyze noise picked up by a microphone 37 as in the first embodiment, when a noise condition is always determined, hypersensitive reaction might occur due to unexpected noise, so that it also is supposed that filter coefficient setting is changed more than is necessary.

In this example, it is possible to avoid reaction to the unexpected noise by estimating a present location of the user (noise environment) by the current position detection (and the current motion speed) without using audio information.

Then, it is possible to precisely determine the noise environment and easily determine the optimal NC mode according to a noise environment type.

Since there is no noise analyzing process burden and the controller/arithmetic unit 31 may determine the optimal NC mode by a simple process to capture the position information and refer to the map database, so that a process burden on the portable terminal 2 side is also made smaller.

Therefore, it is possible to realize the portable terminal 2 of this example by using a device without the microphone (for example, a PDA and the like) and a simple portable device with a small processing resource.

Meanwhile, there may be various activation triggers of the process on the portable terminal 2 side at step F100 in FIG. 13 as in a case described with reference to FIG. 4 of the first embodiment. That is, to periodically perform the process in FIG. 13 for every predetermined time, to execute the same according to detected information by a position sensor, a temperature sensor, an atmospheric pressure sensor, an altitude sensor, and a motion speed sensor, or the user operation may be made the trigger.

Especially, in the configuration of the fourth embodiment, the position detecting unit 40 (which is also a speed detecting unit) is provided as the GPS receiver, so that it is preferable that the position and the speed are always detected and the process in FIG. 13 is executed when change in position and speed is equal to or larger than predetermined change.

It is also possible that the activation trigger is not especially sequentially determined and the NC process optimization program is always executed.

For example, it is configured that the position detecting process and an optimal NC mode determining process described at steps F102A and F103A are always executed on the portable terminal 2 side. This is an example in which, when a determination result of the optimal NC mode is changed, a process to establish the communication with the headphone device 1 is performed and the indication information is transmitted to the headphone device 1.

Meanwhile, although it is described above that the map database is stored in the memory unit 32, it is not necessary that the map database be included in the portable terminal 2.

For example, when the controller/arithmetic unit 31 obtains the current position information, this transmits the current position information to an external server by the network communicating unit 39. In the external server, the map database is referred to for the transmitted current position information and the noise environment is determined to be transmitted to the portable terminal 2. By receiving the same, the portable terminal 2 may determine the noise environment even when this does not store the map database.

Further, it is also possible that the external server is allowed to execute the function of determining the optimal NC mode and the portable terminal 2 receives information of the optimal NC mode (moreover, information of a specific filter coefficient) from the external server. In that context, the portable terminal 2 does not have to have the function of determining the optimal NC mode.

That is, it may be configured that the optimal NC mode (when the concept of the second embodiment is applied, the optimal filter coefficient itself) is eventually obtained in a method of so-called cloud computing and this is transmitted to the headphone device 1.

A following process example is also considered as an application example in a case in which the position detecting unit 40 and the map database are used.

Figure 14:
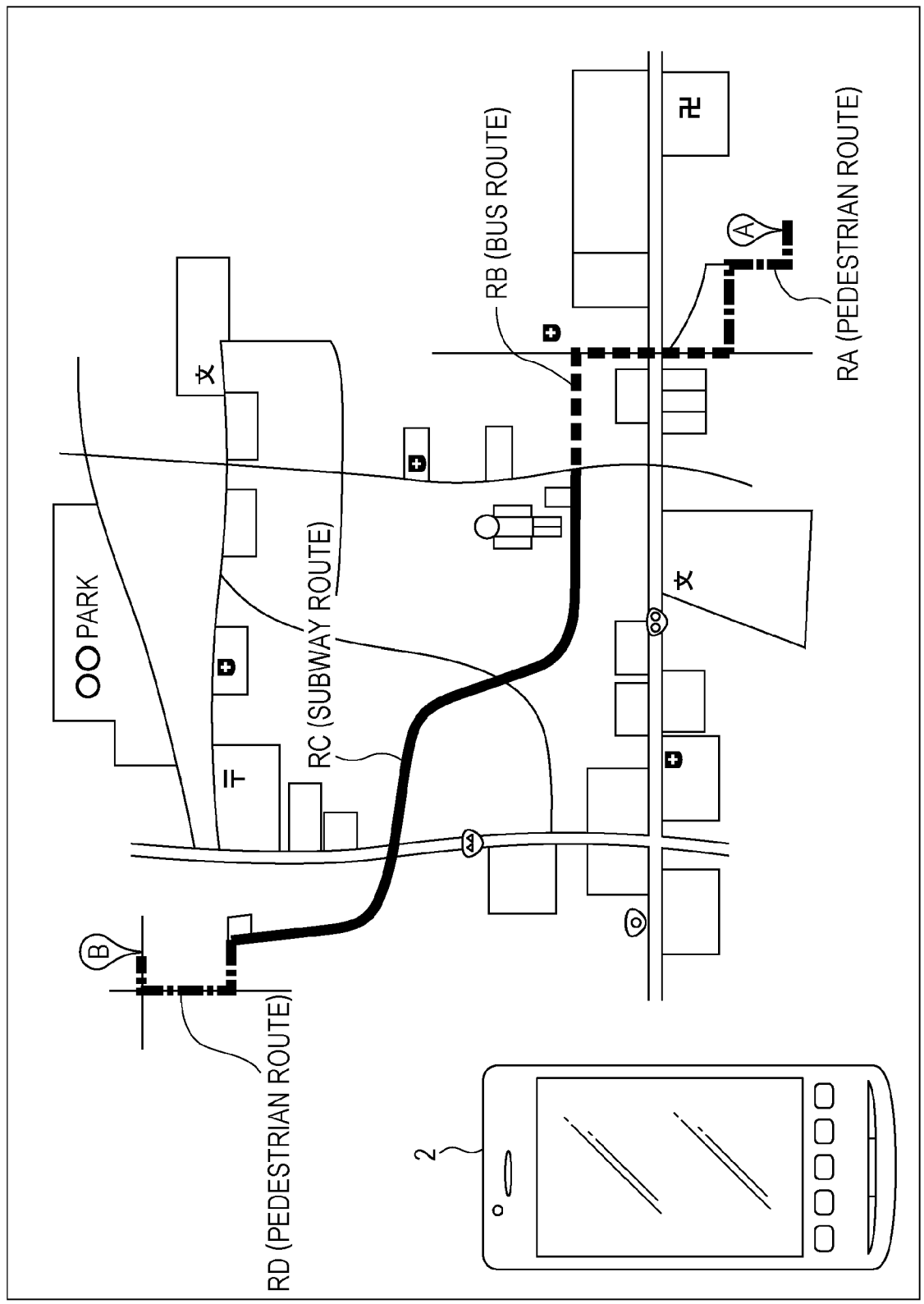
FIG. 14 is an illustrative diagram of route setting of the fourth embodiment.

For example, as illustrated in FIG. 14, map display is executed by the portable terminal 2 and the user inputs an attendance/commutation route in advance.

It is possible to automatically determine a transportation section, a pedestrian section and the like on the attendance/commutation route before starting/using, and it becomes possible to provide the optimal NC according to the ambient environment to a headphone main body side by tracing the position of the user by the GPS at the time of actual attendance/commutation.

For example, suppose that the user inputs a point A to point B illustrated in FIG. 14. In this case, the controller/arithmetic unit 31 may automatically set a section RA as a pedestrian route, a section RB as a bus route, a section RC as a subway route, a section RD as the pedestrian route and the like with reference to the map database. Alternatively, the user may input the pedestrian route, the bus route and the like.

If a pedestrian (urban area) mode, a bus mode, the subway mode and the like are prepared as the NC mode, NC mode control according to the current position may be appropriately performed. That is, the portable terminal 2 automatically determines that the mode is the pedestrian mode when the current position is determined to be in the section RA, the mode is the bus mode when the current position is determined to be in the section RB, the mode is the subway mode when the current position is determined to be in the section RC, and the mode is the pedestrian mode when the current position is determined to be in the section RD, and the headphone device 1 side sets the NC mode. The user may always listen to the music and the like in the optimal NC mode on the attendance/commutation route.

Meanwhile, if a great number of NC modes are prepared and the mode is selected out of them, the corresponding NC mode is preferably automatically set in each section on the route; however, section setting and moving means estimation in the section are not necessary automatic but may be manually specified by the user. For example, there may be a user who walks in a section in which it is automatically determined that the bus is used. Therefore, the optimal NC mode selection for an individual user becomes possible by allowing the user to specify to walk, to take the bus, or to take a train.

For example, it is also possible to feedback to a common database for the users such as "a certain NC mode is better in this section" as impression of the user for development/improvement of new NC means.

<7. Fifth Embodiment (Example of Various Combined Detection)>

An example in which a sensor device (a microphone 37 or a position detecting unit 40 (GPS receiver)) embedded on a portable terminal 2 side is individually used is heretofore described as cooperation between the portable terminal 2 and a headphone device 1. However, in addition, highly accurate condition estimation becomes possible by analyzing a noise signal picked up by the microphone 37, analyzing a current position and a current conveyance from usage of both of the position detecting unit 40/map data base and using both pieces of information together.

Further, in consideration of the portable terminal 2 such as a smartphone provided with a temperature sensor and an atmospheric pressure sensor, it may be possible to realize higher accuracy by simultaneously reflecting these pieces of information.

Therefore, an example of various combined detection is described as a fifth embodiment.

Figure 15:
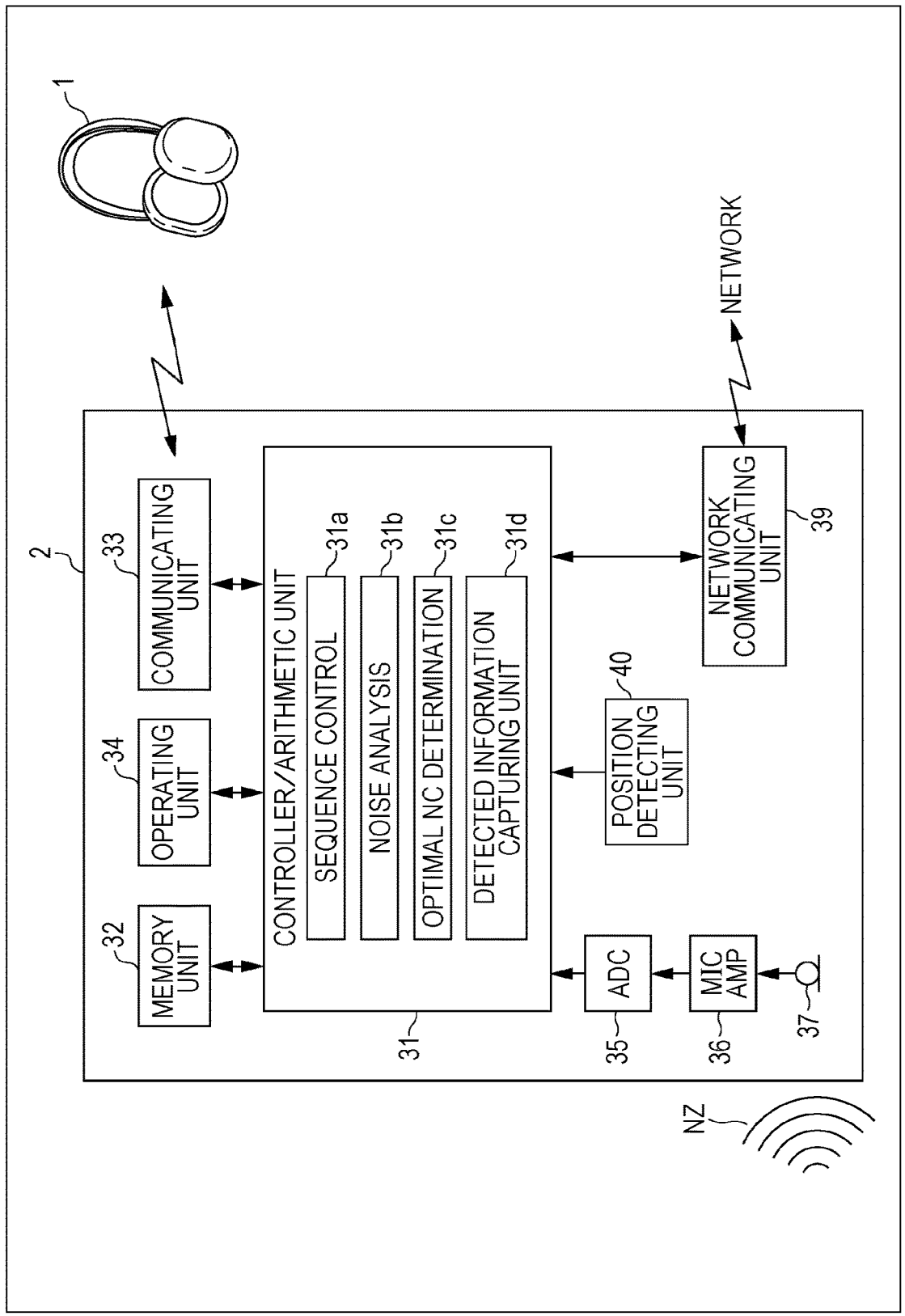
FIG. 15 is a block diagram of a configuration example of a portable terminal of a fifth embodiment.

FIG. 15 is a configuration example in which noise analysis and position detection are used together. That is, the portable terminal 2 is provided with the microphone 37, a microphone amplifier 36, and an A/D converter 35 and a controller/arithmetic unit 31 includes a noise analyzing unit 31b. In addition, the position detecting unit 40 is provided and the controller/arithmetic unit 31 includes a detected information capturing unit 31d. An NC system database and a map database are stored in a memory unit 32.

By such a configuration, it becomes possible to estimate a noise environment from a position detection result and to determine accuracy of the noise environment estimation by an actual noise analysis result to determine an optimal NC mode.

It is also possible to modify the optimal NC mode and an optimal filter coefficient derived from the noise analysis result by adding the noise environment estimated from position information.

Figure 16:
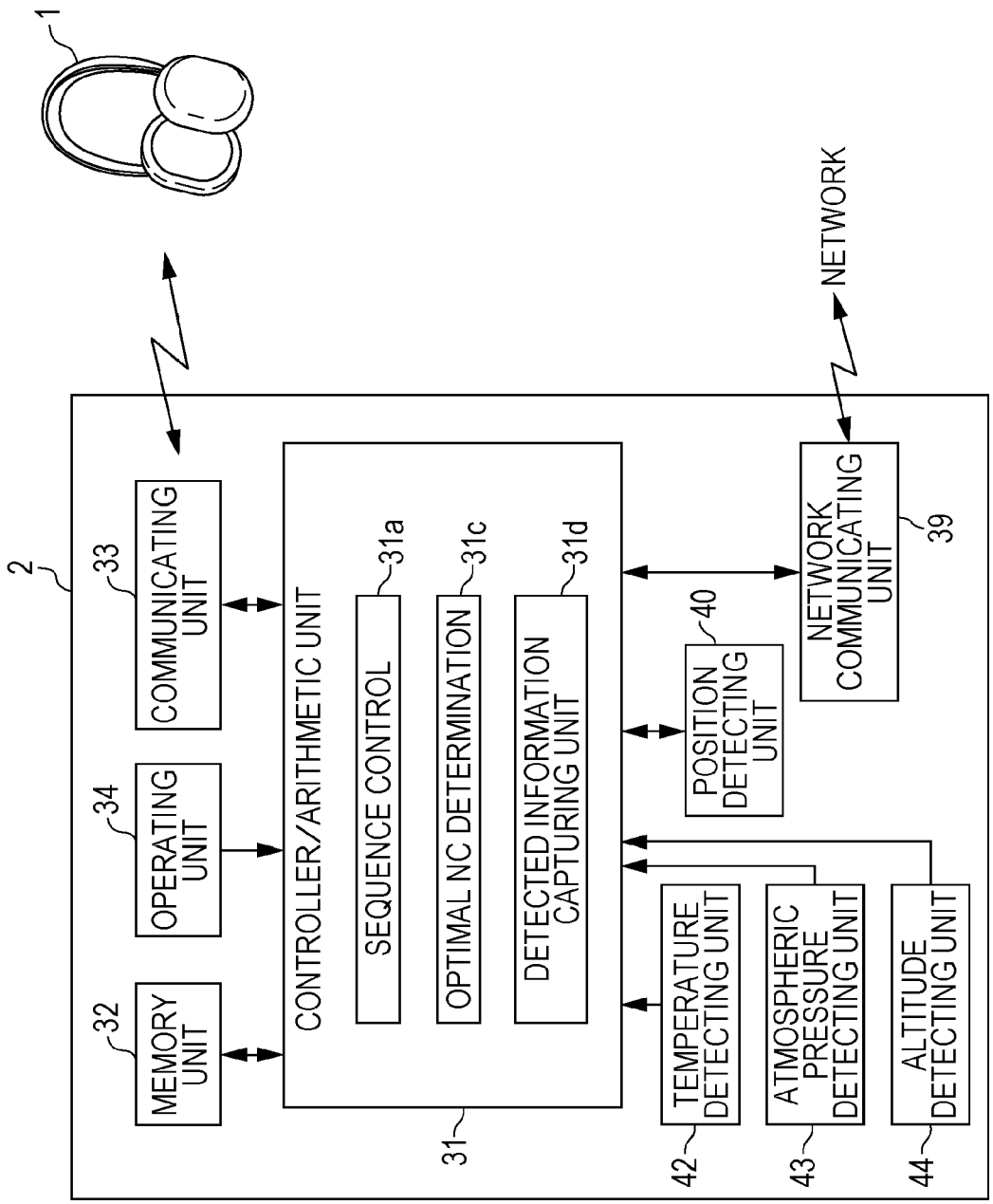
FIG. 16 is a block diagram of a configuration example of the portable terminal of the fifth embodiment.

Next, FIG. 16 is a configuration example obtained by adding a temperature detecting unit 42, an atmospheric pressure detecting unit 43, and an altitude detecting unit 44 to the configuration of the portable terminal 2 of the above-described fourth embodiment.

It is possible to modify the filter coefficient according to the noise environment estimated from the position information by detecting temperature by the temperature detecting unit 42.

It is possible to correctly determine the noise environment such as in an airplane by detecting an atmospheric pressure by the atmospheric pressure detecting unit 43. Further, an auditory sense of a user significantly changes depending on the atmospheric pressure. Therefore, it becomes also possible to adjust the filter coefficient according to the atmospheric pressure.

Figure 17:
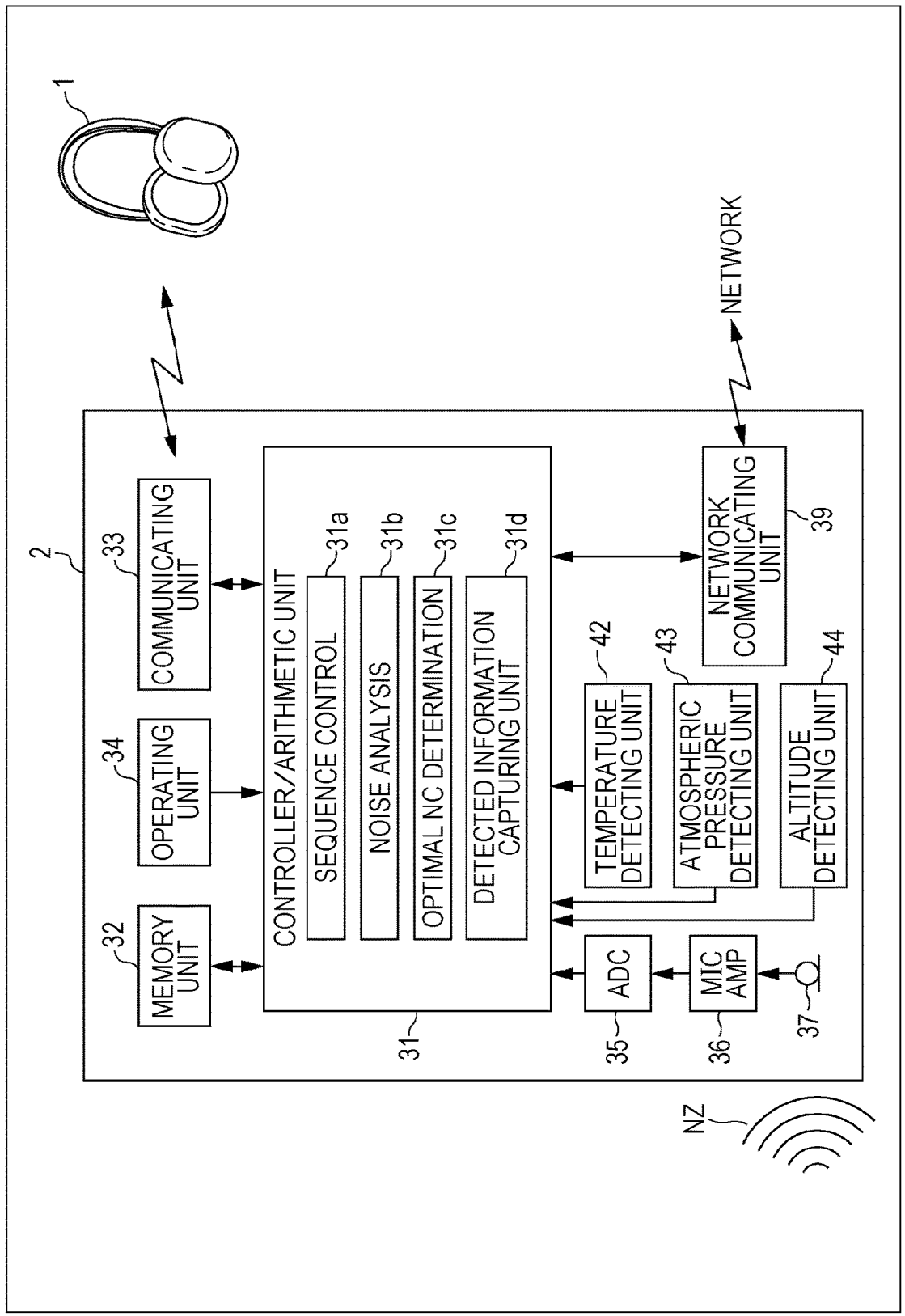
FIG. 17 is a block diagram of a configuration example of the portable terminal of the fifth embodiment.

It becomes possible to correctly determine the noise environment such as in the airplane by detecting altitude by the altitude detecting unit 44. It also becomes possible to adjust the filter coefficient according to the altitude in consideration of change in atmospheric pressure according to the altitude. FIG. 17 is a configuration example obtained by adding the temperature detecting unit 42, the atmospheric pressure detecting unit 43, and the altitude detecting unit 44 to the configuration of the portable terminal 2 of the above-described first embodiment. As in the case in FIG. 16, detected information of each detecting unit may be used.

That is, the portable terminal 2 is configured to be provided with a part of or all of the temperature detecting unit 42 which detects current temperature information, the atmospheric pressure detecting unit 43 which detects current atmospheric pressure information, and the altitude detecting unit 44 which detects current altitude information. According to this, the controller/arithmetic unit 31 may generate more appropriate indication information by using any of the temperature information, the atmospheric pressure information, and the altitude information in addition to a noise analysis result or a noise environment determination result by the position.

<8. Uploading System>

Subsequently, a system which uploads information from a portable terminal 2 and a headphone device 1 is described.

Figure 18:
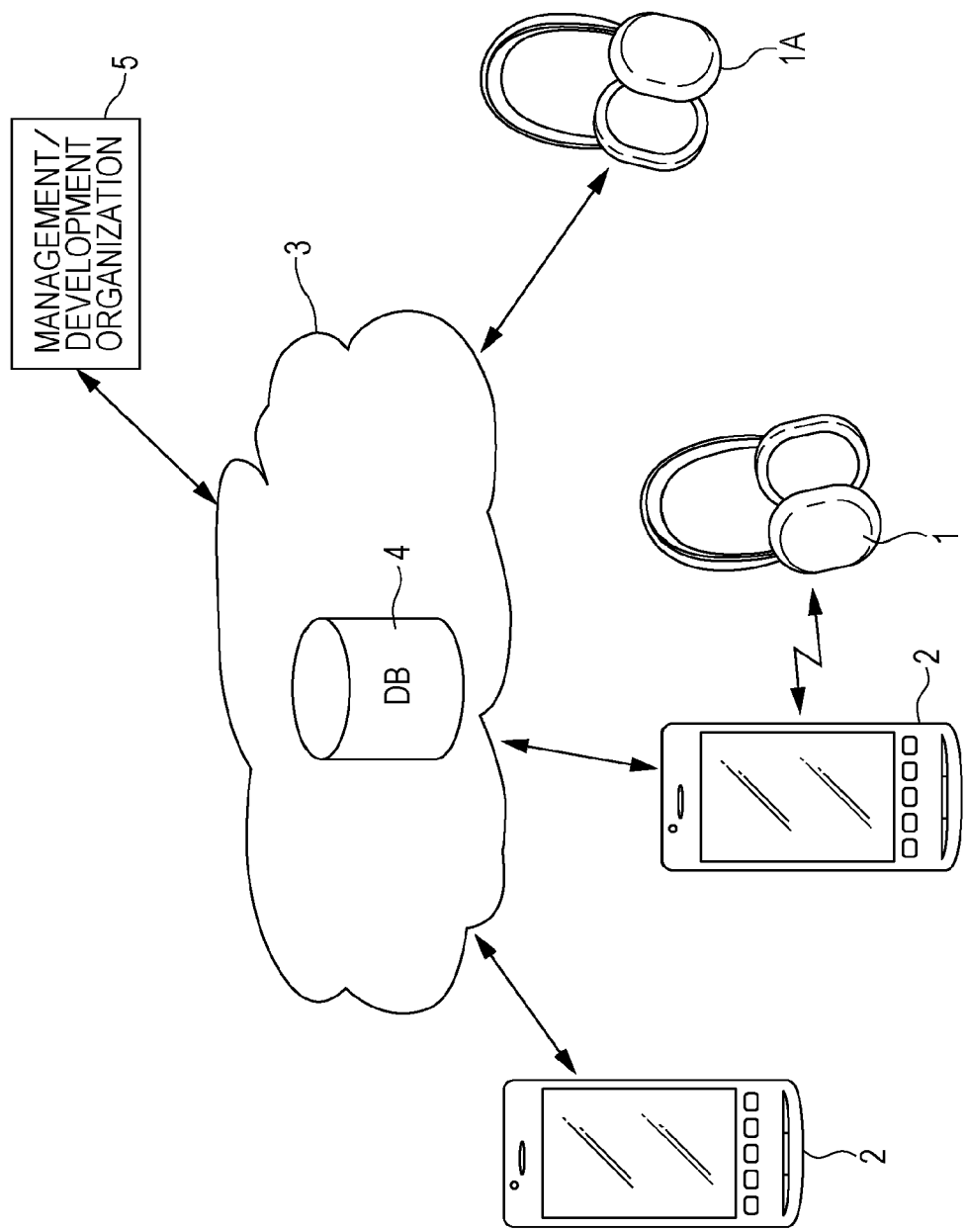
FIG. 18 is an illustrative diagram of an uploading system of the embodiment.

FIG. 18 illustrates a situation in which the portable terminal 2 or the headphone device 1 provided with a position detecting function or a communicating function for uploading uploads the information to a database 4 on a network (cloud).

A mechanism in which the portable terminal 2 or the headphone device 1 of each user transmits current position information, analysis information of actually observed ambient noise, model information (for correcting property sensitivity of the microphone 37), a user comment (how the user feels when using an optimal NC mode, for example) and the like to the database 4 side on the cloud through an application is configured.

As described above, in a case in which the portable terminal 2 uploads the current position information, a process in which this allows a server side to perform a process to determine noise environment information, an optimal NC mode, or an optimal filter coefficient and simply receives a result is also possible. In this case, even the portable terminal 2 with a small calculation resource therein may allow the headphone device 1 to execute an appropriate NC mode without performing detailed analysis by using such information from the cloud.

It also becomes possible to update the filter coefficient in the NC mode, develop a new NC mode, and feed back an achievement to the user by a management/development organization 5 by uploading the above-described information from the portable terminal 2 and the headphone device 1 to the database 4.

For example, when the analysis information of the ambient noise and the user comment are accumulated as data in the database 4 on the cloud, an NC system developer of the management/development organization 5 (mainly, an engineer of a manufacturer) who watches this may develop and design the new NC mode based on the information and provide the same. The newly created NC mode (filter coefficient) is sent to the headphone device 1 through the portable terminal 2.

At that time, the portable terminal 2 side is connected to the headphone device 1 by means of Bluetooth/Wi-Fi and the like, so that a model name and the like of the connected headphone device 1 may be obtained. It is possible to refer to the cloud side by using the model name. It becomes possible that the portable terminal 2 uses a new filter which is not used in the past by specifying an index when a plurality of NC modes (digital filters) is preset in the headphone device 1 or by sending a filter itself (coefficient value and a configuration method) in a case of the new NC mode.

<9. Program>

A program of embodiments is an NC process optimization program described in the above-described first to fourth embodiments.

For example, the NC process optimization program described in the first to third embodiments is the program to allow an arithmetic processing device (a DSP or a CPU as a controller/arithmetic unit 31) of a portable terminal 2 to execute at least a process to perform noise analysis for an audio signal picked up by a microphone 37 which picks up at least a sound from outside, a process to generate indication information (indication information to indicate an NC mode or a filter coefficient itself in the NC mode) to indicate a processing parameter related to a noise canceling process by an the external headphone device 1 from a noise analysis result, and a process to transmit the indication information to the headphone device 1.

The NC process optimization program described in the fourth embodiment is the program to allow the arithmetic processing device (the DSP or the CPU as the controller/arithmetic unit 31) of the portable terminal 2 to execute a process to obtain current position information from a position detecting unit 40 which detects the current position information, a process to generate the indication information (indication information to indicate the NC mode or the filter coefficient itself in the NC mode) to indicate the processing parameter related to the noise canceling process in the external headphone device 1 based on the current position information, and a process to transmit the indication information to the headphone device 1.

Such program may be recorded in advance in a flash memory, a ROM, a HDD as a recording medium embedded in the portable terminal 2 or the ROM and the like in a microcomputer.

Alternatively, the program may be temporarily or permanently stored in (recorded on) a removable recording medium such as a flexible disk, a CD-ROM (compact disc read only memory), MO (magnet optical) disk, a DVD (digital versatile disc), a magnetic disk, and a semiconductor memory. Such removable recording medium may be provided as so-called package software.

The program may be installed from the removable recording medium or downloaded from a download site through a network such as a LAN (local area network) and the Internet.

It also becomes possible to allow a versatile portable terminal device to serve as the portable terminal 2 of the embodiments by installing such program.

The portable terminal 2 of the embodiments may be widely provided to the users by such program and the user may easily enjoy an effect of a headphone system of each embodiment.

<10. Modification>

Although the various embodiments are heretofore described, the technology of this disclosure may have further various modifications.

Although an example in which a portable terminal 2 and a headphone device 1 wirelessly communicate with each other is described, wired communication between them is also possible.

Although the headphone device 1 is referred to as a stereo headphone for the purpose of description, this may also be a monaural headphone having an NC system.

Although an NC mode or a filter coefficient itself is transmitted as indication information from the portable terminal 2 to the headphone device 1, various pieces of indication information (control information) other than this may also be transmitted.

For example, it is also possible to transmit signals of controlling a sound volume according to a noise environment determined from a noise analysis result and a current position or of controlling acoustic quality correction (filter coefficient of equalizing) or acoustic effect process which is not directly related to the NC mode.

Further, when a combined type configuration is provided, for example, it is also possible that the combined type, a feedback type, and a feedforward type are selectable and the selected control information may be transmitted as the indication information.

Although the "portable" device is assumed as the portable terminal 2; however, this is not necessarily limited to be portable. For example, a fixed terminal device which performs the process described in the embodiments is arranged in each position. It is also possible to communicate with the headphone device 1 capable of communicating (headphone device 1 which an approaching user possesses) to transmit the indication information such as the NC mode or the filter coefficient itself.

Meanwhile, the headphone device of this technology may also have a following configuration.

(1) A headphone device including:
a driver unit which outputs a sound;
a microphone which picks up at least a sound from outside;
a noise canceling processor which performs a filtering process for an audio signal picked up by the microphone to generate a noise canceling signal, synthesizes the noise canceling signal with an input audio signal to obtain an output audio signal, and supplies the output audio signal to the driver unit;
a communicating unit which communicates with an external terminal device; and
a controller which performs a setting process of a processing parameter for the filtering process of the noise canceling processor based on indication information transmitted from the terminal device and received by the communicating unit.

(2) The headphone device according to (1) described above, including:
a signal processor which performs signal processing for the input audio signal, wherein
the controller performs a setting process of a processing parameter of the signal processor based on the indication information received by the communicating unit.

(3) The headphone device according to (1) or (2) described above, including:
a storage unit which stores the processing parameter, wherein
the controller reads the processing parameter from the storage unit to perform the setting process based on the indication information received by the communicating unit.

(4) The headphone device according to (1) or (2) described above, wherein
the communicating unit receives the processing parameter as the indication information, and
the controller performs the setting process by using the processing parameter received by the communicating unit.

(5) The headphone device according to any one of (1) to (4) described above, wherein
the communicating unit also receives an audio signal and the audio signal is made the input audio signal.

REFERENCE SIGNS LIST

1 Headphone device, 2 Portable terminal, 11 Controller, 12 Memory unit, 13 Communicating unit, 14FF, 14FB, 37 Microphone, 17FF FF-DNC filter, 17FB FB-DNC filter, 19 Equalizer, 21 Driver unit, 27 DSP, 31 Controller/arithmetic unit, 31*a* Sequence controller, 31*b* Noise analyzing unit, 31*c* Optimal NC determining unit, 31*d* Detected information capturing unit, 32 Memory unit, 33 Communicating unit, 40 Position detecting unit

The invention claimed is:
1. A headphone device, comprising:
a driver unit configured to output a sound;
a first microphone configured to pick up a first audio signal from outside the headphone device;
a noise canceling processor configured to:
filter the first audio signal picked up by the first microphone to generate a noise canceling signal;
synthesize the noise canceling signal with an input audio signal to obtain an output audio signal; and
supply the output audio signal to the driver unit;
a communicating unit configured to:
communicate with a terminal device based on an activation of a trigger operation associated with a user operation, wherein the terminal device is different from the headphone device; and
receive indication information from the terminal device based on the trigger operation, wherein
the indication information is generated by the terminal device based on a selection of a noise cancelation mode,
the noise cancelation mode is selected by the terminal device based on analysis of a property of external noise in a second audio signal picked up by a second microphone of the terminal device,
the selected noise cancelation mode corresponds to a type of the external noise, and
the selected noise cancelation mode is associated with a plurality of filter coefficients having a property opposite to the property of the external noise; and
a controller configured to set the plurality of filter coefficients as a first processing parameter based on the second audio signal picked up by the second microphone of the terminal device and the received indication information that indicates the selected noise cancelation mode,
wherein the filter of the first audio signal is based on the set plurality of filter coefficients.

2. The headphone device according to claim 1, further comprising:
a signal processor configured to process the input audio signal,
wherein the controller is further configured to set a second processing parameter of the signal processor based on the received indication information.

3. The headphone device according to claim 1, further comprising:
a storage unit configured to store the first processing parameter,
wherein the controller is further configured to read the first processing parameter from the storage unit.

4. The headphone device according to claim 1, wherein the communicating unit is further configured to receive a third audio signal, and
the third audio signal corresponds to the input audio signal.

5. A terminal device, comprising:
a first microphone configured to pick up a first audio signal from outside the terminal device;
a communicating unit configured to communicate with a headphone device, wherein
the headphone device is different from the terminal device, and
the headphone device communicates with the terminal device based on an activation of a trigger operation associated with a user operation; and
a controller configured to:
analyze a property of external noise in the first audio signal picked up by the first microphone;
select a noise cancelation mode based on the analysis, wherein
the selected noise cancelation mode corresponds to a type of the external noise, and the selected noise cancelation mode is associated with a plurality of filter coefficients having a property opposite to the property of the external noise;
generate indication information that indicates the selected noise cancelation mode; and
control the communicating unit to transmit the indication information to the headphone device, wherein
the headphone device includes a second microphone that picks up a second audio signal from outside the headphone device, and
the headphone device:
sets the plurality of filter coefficients as a processing parameter based on the first audio signal picked up by the first microphone of the terminal device and the indication information that indicates the selected noise cancelation mode,
executes a filter process of the second audio signal based on the set plurality of filter coefficients, and
generates a noise canceling signal based on the executed filter process.

6. The terminal device according to claim 5, further comprising:
a temperature detecting unit configured to detect current temperature information of the terminal device;
an atmospheric pressure detecting unit configured to detect atmospheric pressure information; and
an altitude detecting unit configured to detect altitude information of the terminal device, wherein
the controller is further configured to generate the indication information based on the analysis and at least one of the current temperature information, the atmospheric pressure information, or the altitude information.

7. An information transmitting method, comprising:
in a terminal device:
picking up, by a first microphone of the terminal device, a first audio signal from outside the terminal device;
analyzing, by a controller of the terminal device, a property of external noise in the first audio signal;
selecting, by the controller, a noise cancelation mode based on the analysis, wherein
the selected noise cancelation mode corresponds to a type of the external noise, and
the selected noise cancelation mode is associated with a plurality of filter coefficients having a property opposite to the property of the external noise;
generating, by the controller, indication information that indicates the selected noise cancelation mode; and
controlling, by the controller, transmission of the generated indication information to a headphone device, wherein
the headphone device is different from the terminal device, and
the headphone device includes a second microphone that picks up a second audio signal from outside the headphone device, and
the headphone device:
communicates with the terminal device based on an activation of a trigger operation associated with a user operation,
sets the plurality of filter coefficients as a processing parameter based on the first audio signal picked up by the first microphone of the terminal device and the indication information that indicates the selected noise cancelation mode,
executes a filter process of the second audio signal based on the set plurality of filter coefficients, and
generates a noise canceling signal based on the executed filter process.

8. A non-transitory computer-readable medium having stored thereon computer-executable instructions that, when executed by a processor of a terminal device, cause the processor to execute operations, the operations comprising:
controlling a first microphone of the terminal device to pick up a first audio signal from outside the terminal device;
analyzing a property of external noise in the first audio signal;
selecting a noise cancelation mode based on the analysis, wherein
the selected noise cancelation mode corresponds to a type of the external noise, and
the selected noise cancelation mode is associated with a plurality of filter coefficients having a property opposite to the property of the external noise;
generating indication information that indicates the selected noise cancelation mode; and
controlling transmission of the generated indication information to a headphone device, wherein
the headphone device is different from the terminal device,
the headphone device includes a second microphone that picks up a second audio signal from outside the headphone device, and
the headphone device:
communicates with the terminal device based on an activation of a trigger operation associated with a user operation,
sets the plurality of filter coefficients as a processing parameter based on the first audio signal picked up by the first microphone of the terminal device and the indication information that indicates the selected noise cancelation mode,
executes a filter process of the second audio signal based on the set plurality of filter coefficients, and
generates a noise canceling signal based on the executed filter process.

9. A terminal device, comprising:
a first microphone configured to pick up a first audio signal from outside the terminal device;
a position detecting unit configured to detect current position information of the terminal device;
a communicating unit configured to communicate with a headphone device, wherein
the headphone device is different from the terminal device, and
the headphone device communicates with the terminal device based on an activation of a trigger operation associated with a user operation; and
a controller configured to:
analyze a property of external noise in the first audio signal;
select a noise cancelation mode based on the analysis, wherein
the selected noise cancelation mode corresponds to a type of the external noise, and
the selected noise cancelation mode is associated with a plurality of filter coefficients having a property opposite to the property of the external noise;

generate indication information based on the detected current position information, wherein the indication information indicates the selected noise cancelation mode; and control the communicating unit to transmit the indication information to the headphone device, wherein the headphone device includes a second microphone that picks up a second audio signal from outside the headphone device, and the headphone device:
sets the plurality of filter coefficients as a processing parameter based on the first audio signal picked up by the first microphone of the terminal device and the indication information that indicates the selected noise cancelation mode, executes a filter process of the second audio signal based on the set plurality of filter coefficients, and generates a noise cancelling signal based on the executed filter process.

10. The terminal device according to claim 9, further comprising:
a temperature detecting unit configured to detect current temperature information of the terminal device;
an atmospheric pressure detecting unit configured to detect atmospheric pressure information; and
an altitude detecting unit configured to detect altitude information of the terminal device, wherein
the controller is further configured to generate the indication information based on the current position information and at least one of the current temperature information, the atmospheric pressure information, or the altitude information.

11. An information transmitting method, comprising:
in a terminal device that comprises a first microphone, a position detecting unit, a controller, and a communicating unit:
picking up, by the first microphone, a first audio signal from outside the terminal device;
obtaining, by the position detecting unit, current position information of the terminal device;
analyzing, by the controller, a property of external noise in the first audio signal;
selecting, by the controller, a noise cancelation mode based on the analysis, wherein
the selected noise cancelation mode corresponds to a type of the external noise, and
the selected noise cancelation mode is associated with a plurality of filter coefficients having a property opposite to the property of the external noise;
generating, by the controller, indication information based on the current position information, wherein the indication information indicates the selected noise cancelation mode; and
transmitting, by the communicating unit, the generated indication information to a headphone device, wherein
the headphone device is different from the terminal device,
the headphone device includes a second microphone that picks up a second audio signal from outside the headphone device, and
the headphone device:
communicates with the terminal device based on an activation of a trigger operation associated with a user operation,
sets the plurality of filter coefficients as a processing parameter based on the first audio signal picked up by the first microphone of the terminal device and the indication information that indicates the selected noise cancelation mode,
executes a filter process of the second audio signal based on the set plurality of filter coefficients, and
generates a noise canceling signal based on the executed filter process.

12. A non-transitory computer-readable medium having stored thereon computer-executable instructions that, when executed by a processor of a terminal device, cause the processor to execute operations, the operations comprising:
controlling a first microphone of the terminal device to pick up a first audio signal from outside the terminal device;
obtaining current position information of the terminal device;
analyzing a property of external noise in the first audio signal;
selecting a noise cancelation mode based on the analysis, wherein
the selected noise cancelation mode corresponds to a type of the external noise, and
the selected noise cancelation mode is associated with a plurality of filter coefficients having a property opposite to the property of the external noise;
generating indication information based on the current position information, wherein the indication information indicates the selected noise cancelation mode; and
controlling transmission of the generated indication information to a headphone device, wherein
the headphone device is different from the terminal device,
the headphone device includes a second microphone that picks up a second audio signal from outside the headphone device, and
the headphone device:
communicates with the terminal device based on an activation of a trigger operation associated with a user operation,
sets the plurality of filter coefficients as a processing parameter based on the first audio signal picked up by the first microphone of the terminal device and the indication information that indicates the selected noise cancelation mode,
executes a filter process of the second audio signal based on the set plurality of filter coefficients, and
generates a noise canceling signal based on the executed filter process.

13. A system, comprising:
a headphone device; and
a terminal device different from the headphone device, wherein the terminal device comprises:
a first microphone configured to pick up a first audio signal from outside the terminal device;
a first communicating unit configured to communicate with the headphone device; and
a first controller configured to:
analyze a property of external noise in the first audio signal picked up by the first microphone;
select a noise cancelation mode based on the analysis, wherein
the selected noise cancelation mode corresponds to a type of the external noise, and
the selected noise cancelation mode is associated with a plurality of filter coefficients having a property opposite to the property of the external noise;

generate indication information that indicates the selected noise cancelation mode; and control the first communicating unit to transmit the indication information to the headphone device, wherein the headphone device comprises:

a driver unit configured to output a sound;

a second microphone configured to pick up a second audio signal from outside the headphone device;

a noise canceling processor configured to:
filter the second audio signal picked up by the second microphone to generate a noise canceling signal;
synthesize the noise canceling signal with an input audio signal to obtain an output audio signal; and
supply the output audio signal to the driver unit;

a second communicating unit configured to:
communicate with the terminal device based on an activation of a trigger operation associated with a user operation; and
receive the indication information from the terminal device based on the trigger operation; and a second controller configured to set the plurality of filter coefficients as a processing parameter based on the first audio signal picked up by the first microphone of the terminal device and the received indication information that indicates the selected noise cancelation mode, wherein
the filter of the second audio signal is based on the set plurality of filter coefficients.

14. A system, comprising:

a headphone device; and a terminal device different from the headphone device, wherein the terminal device comprises:

a first microphone configured to pick up a first audio signal from outside the terminal device;

a position detecting unit configured to detect current position information of the terminal device;

a first communicating unit configured to communicate with the headphone device; and a first controller configured to:
analyze a property of external noise in the first audio signal;
select a noise cancelation mode based on the analysis, wherein
the selected noise cancelation mode corresponds to a type of the external noise, and
the selected noise cancelation mode is associated with a plurality of filter coefficients having a property opposite to the property of the external noise;
generate indication information based on the current position information, wherein the indication information indicates the selected noise cancelation mode; and
control the first communicating unit to transmit the indication information to the headphone device, wherein the headphone device comprises:

a driver unit configured to output a sound;

a second microphone configured to pick up a second audio signal from outside the headphone device;

a noise canceling processor configured to:
filter the second audio signal picked up by the second microphone to generate a noise canceling signal;
synthesize the noise canceling signal with an input audio signal to obtain an output audio signal; and
supply the output audio signal to the driver unit;

a second communicating unit configured to:
communicate with the terminal device based on an activation of a trigger operation associated with a user operation;
receive the indication information from the terminal device based on the trigger operation; and a second controller configured to set the plurality of filter coefficients as a processing parameter based on the first audio signal picked up by the first microphone of the terminal device and the received indication information that indicates the selected noise cancelation mode, wherein
the filter of the second audio signal is based on the set plurality of filter coefficients.

* * * * *